US009301014B2

(12) United States Patent (10) Patent No.: US 9,301,014 B2
Fukuda (45) Date of Patent: Mar. 29, 2016

(54) HANDHELD TERMINAL, INFORMATION PROVIDING METHOD, INFORMATION PROCESSING PROGRAM, INFORMATION PROVIDING SERVER, BROADCASTING RECEPTION APPARATUS, AND INFORMATION PROVIDING SYSTEM

(71) Applicant: Sony Corporation, Tokyo (JP)

(72) Inventor: Kazuhiro Fukuda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/050,971

(22) Filed: Oct. 10, 2013

(65) Prior Publication Data

US 2014/0040957 A1 Feb. 6, 2014

Related U.S. Application Data

(63) Continuation of application No. 12/462,536, filed on Aug. 5, 2009, now Pat. No. 8,661,467.

(30) Foreign Application Priority Data

Aug. 7, 2008 (JP) ............................... P2008-204744

(51) Int. Cl.
*H04N 21/4722* (2011.01)
*H04N 5/44* (2011.01)
(Continued)

(52) U.S. Cl.
CPC ......... *H04N 21/4722* (2013.01); *H04N 5/4403* (2013.01); *H04N 5/44543* (2013.01); *H04N 7/17318* (2013.01); *H04N 21/4126* (2013.01);
(Continued)

(58) Field of Classification Search
CPC ........................... H04N 21/4722; H04H 60/27
See application file for complete search history.

(56) References Cited

U.S. PATENT DOCUMENTS 7,895,532 B2  2/2011  Scott et al.
2002/0100063 A1  7/2002  Herigstad et al.
(Continued)

FOREIGN PATENT DOCUMENTS

JP  11-266408 A  9/1999
JP  11266409 A  9/1999
(Continued)

OTHER PUBLICATIONS

Office Action from Japanese Application No. 2008-204744, dated Jul. 6, 2010.

*Primary Examiner* — Nathan Flynn
*Assistant Examiner* — James R Marandi
(74) *Attorney, Agent, or Firm* — Lerner, David, Littenberg, Krumholz & Mentlik, LLP

(57) ABSTRACT

A handheld terminal includes a device communication unit which communicates with at least one or more broadcasting reception apparatus receiving contents and content information about the contents from a content provider and receives the content information from the broadcasting reception apparatus, a content display unit which displays the content information received from the broadcasting reception apparatus, a server communication unit which communicates with an information providing server which manages related information relating to the contents and receives the related information relating to the content information received from the broadcasting reception apparatus from the information providing server, and a related information display unit which displays the related information received from the information providing server.

17 Claims, 25 Drawing Sheets

(51) Int. Cl.

| | | |
|---|---|---|
| *H04N 5/445* | (2011.01) | |
| *H04N 7/173* | (2011.01) | |
| *H04N 21/41* | (2011.01) | |
| *H04N 21/422* | (2011.01) | |
| *H04N 21/4363* | (2011.01) | |
| *H04N 21/475* | (2011.01) | |
| *H04N 21/482* | (2011.01) | |
| *H04N 21/84* | (2011.01) | |
| *H04H 60/27* | (2008.01) | |

(52) U.S. Cl.
CPC ... *H04N 21/42204* (2013.01); *H04N 21/43637* (2013.01); *H04N 21/4751* (2013.01); *H04N 21/4755* (2013.01); *H04N 21/482* (2013.01); *H04N 21/84* (2013.01); *H04H 60/27* (2013.01); *H04N 2005/443* (2013.01); *H04N 2005/4441* (2013.01)

(56) References Cited

U.S. PATENT DOCUMENTS

| | | |
|---|---|---|
| 2003/0204376 A1 | 10/2003 | Obata et al. |
| 2006/0173888 A1 | 8/2006 | Narahara et al. |
| 2007/0290876 A1 | 12/2007 | Sato et al. |
| 2008/0147484 A1 | 6/2008 | Davis |

FOREIGN PATENT DOCUMENTS

| | | |
|---|---|---|
| JP | 2000138876 A | 5/2000 |
| JP | 2001189895 A | 7/2001 |
| JP | 2003169352 A | 6/2003 |
| JP | 2003189267 A | 7/2003 |
| JP | 2004194259 A | 7/2004 |
| JP | 2004-357184 A | 12/2004 |
| JP | 2007324762 A | 12/2007 |
| JP | 2008054065 A | 3/2008 |

FIG. 1
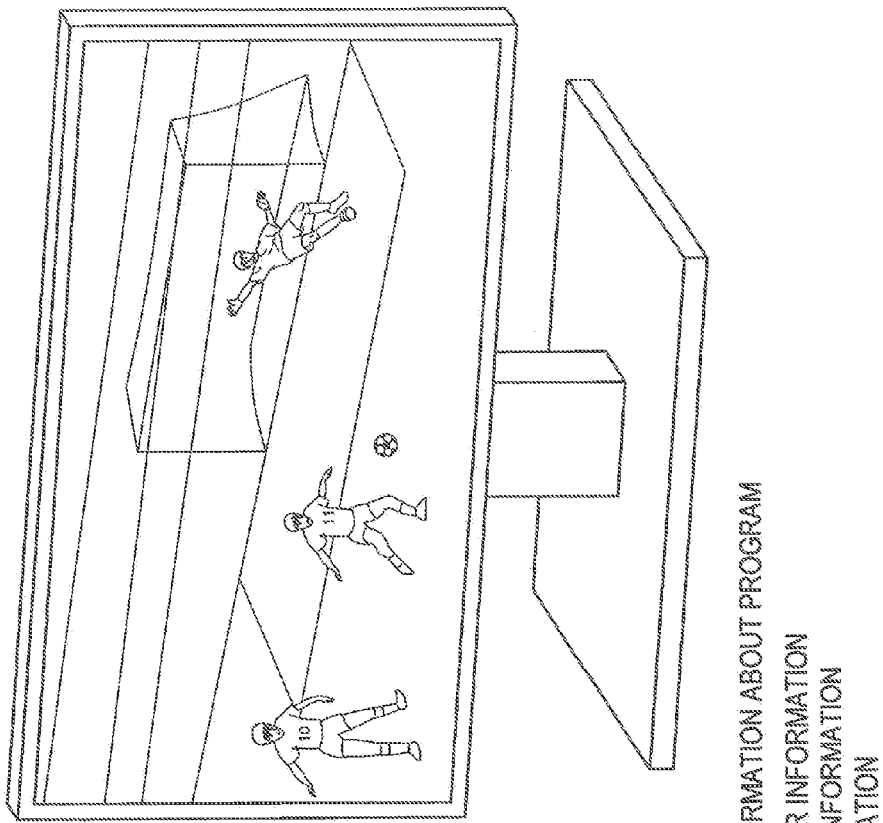
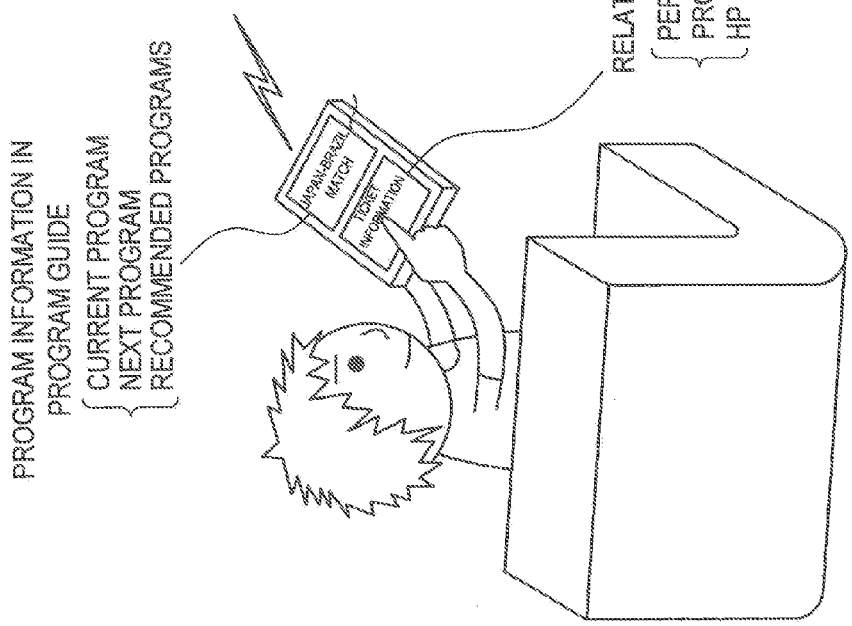

HANDHELD TERMINAL, INFORMATION PROVIDING METHOD, INFORMATION PROCESSING PROGRAM, INFORMATION PROVIDING SERVER, BROADCASTING RECEPTION APPARATUS, AND INFORMATION PROVIDING SYSTEM

CROSS-REFERENCE TO RELATED APPLICATIONS

The present application is a continuation of U.S. patent application Ser. No. 12/462,536, filed in the United States Patent and Trademark Office on Aug. 5, 2009 and claims priority from Japanese Patent Application No. JP 2008-204744 filed in the Japanese Patent Office on Aug. 7, 2008, the entire content of which is incorporated herein by reference.

BACKGROUND OF THE INVENTION

1. Field of the Invention

The present invention relates to a handheld terminal, an information providing method, an information processing program, an information providing server, a broadcasting reception apparatus, and an information providing system.

2. Description of the Related Art

In a broadcasting technical field, a digital broadcasting service is started, and services of various data relating to broadcasting programs such as electronic program guide (EPG) and data broadcasting are provided, in addition to high-definition image service. For example, users can search programs which are or will be broadcasted at the present or in the future, or can set recording with reference to EPG.

According to such diversification of functions, operational facility and simplicity of viewing, selection, reproduction and timer recording of program contents are particularly required. For example, Japanese Unexamined Patent Application Publication No. 2004-357184 discloses a method for displaying detailed operation screen about related program and recording state on a television screen based on a predetermined program selected by a user so as to improve the operational facility and simplicity of viewing, selection and timer recording of program contents.

SUMMARY OF THE INVENTION

However, in order to search programs which are or will be broadcasted at present or in the future or set recording with reference to EPG, a remote controller at hand should be operated in order to operate a program guide to be displayed on a television screen. That is to say, a user has to operate various buttons provided to the remote controller at hand so as to select a command button displayed on the television screen or slide the program guide. Therefore, there was an issue that the operability was complicated.

Also like the above Japanese Unexamined Patent Application Publication No. 2004-357184, various information about related programs and a recording state can be displayed on a television screen, but a user should operate various buttons provided to a remote controller at hand so as to select or execute various information displayed on the television screen. That is to say, the user should interrupt current viewing of a program content or concurrently transmit instructions from the remote controller at hand for the various information displayed on the television screen many times. Therefore, there was an issue of still being inconvenient for users.

In addition, when a user, for example, desires to acquire detailed information about programs, performers and the like in the electronic program guide displayed on a television screen, the user can occasionally acquire predetermined information using a service via the Internet or the like. However, there was an issue that even when using such a service, the user could not view various detailed information without using a menu display or the like displayed on the television screen by operating the remote controller at hand.

That is to say, the remote controllers in related art were nothing more than a device for giving predetermined instructions for various information, menus and the like displayed on a television screen.

The present invention has been made in view of the above issue, and it is desirable to provide a new and improved handheld terminal, an information providing method, an information processing program, an information providing server, a broadcasting reception apparatus and an information providing system which display content information received from the broadcasting reception apparatus and various related information relating to the contents received from the information providing server so as to be capable of improving operability of user's predetermined processes such as viewing, selection, timer recording of the contents and viewing of related information.

According to an embodiment of the present invention, there is provided a handheld terminal including: a device communication unit which communicates with at least one or more broadcasting reception apparatus receiving contents and content information about the contents from a content provider, and receives the content information from the broadcasting reception apparatus; a content display unit which displays the content information received from the broadcasting reception apparatus; a server communication unit which communicates with an information providing server which manages related information relating to the contents and receives related information relating to the content information received by the device communication unit from the information providing server; and a related information display unit which displays the related information received from the information providing server.

In such a configuration, the handheld terminal including a remote controller and the like can receive content information including EPG-SI (Electronic Program Guide Service Information) and the like from the broadcasting reception apparatus including a television and the like. Also, the handheld terminal can display the received content information on a content information display unit. Further, the handheld terminal can receive related information including ECG (Electronic Contents Guide) information and the like about the content information received from the broadcasting reception apparatus from the information providing server including an ECG service server and the like. Further, the handheld terminal can display the related information received from the information providing server on a related information display unit.

The content display unit may display plural pieces of the content information received from the broadcasting reception apparatus while switching sequentially.

The related information display unit may display the related information relating to the content information while switching sequentially according to the content information displayed by the content display unit while being switched sequentially.

The device communication unit may receive content information about currently broadcasting contents, content information about contents to be broadcasted next, content information about contents to be broadcasted today and content information about contents to be broadcasted during a week in content information receivable from the content provider by the broadcasting reception apparatus. In this case, the content display unit can display the content information about the currently broadcasting contents, the content information about the contents to be broadcasted next, the content information about the contents to be broadcasted today and the content information about the contents to be broadcasted during a week, received from the broadcasting reception apparatus, while switching sequentially.

The server communication unit may transmit information about contents preference input by a user as profile information to the information providing server.

The handheld terminal may further include a device management unit which gives a device ID to each broadcasting reception apparatus and manages device information about all the broadcasting reception apparatus with which the device communication unit is communicable.

When a user selects the content information displayed on the content display unit, the device communication unit may transmit a request signal for requesting a predetermined process on contents corresponding to the content information to the broadcasting reception apparatus which has transmitted the content information.

When contents corresponding to the content information selected by the user are the currently broadcasting contents, the device communication unit may transmit a request signal for requesting display of the contents to the broadcasting reception apparatus which transmits the content information.

When contents corresponding to the content information selected by the user are the contents to be broadcasted in the future, the device communication unit may determine whether the broadcasting reception apparatus which has transmitted the content information has a timer recording function based on device information associated with the device ID. In this case, when the broadcasting reception apparatus has a timer recording function, a request signal for requesting timer recording of the contents may be transmitted to the broadcasting reception apparatus.

When a user selects the content information displayed on the content display unit or the related information displayed on the related information display unit, the server communication unit may transmit the content information or the related information selected by the user as contents preference information of the user to the information providing server.

The server communication unit may transmit a filtering request signal to the information providing server so that only the content information matching with user's preference in the plural pieces of content information received from the broadcasting reception apparatus is filtered. In this case, the information providing server can receive content information which is filtered based on the profile information and the contents preference information received from the server communication unit, from the information providing server according to the filtering request signal.

The content display unit may display the filtered content information received from the information providing server while switching sequentially.

According to the embodiments of the present invention described above, an information providing method including the steps of: communicating with at least one or more broadcasting reception apparatus which receive contents and content information about the contents from a content provider, and receiving the content information from the broadcasting reception apparatus; displaying the content information received at the content information receiving step; communicating with an information providing server which manages related information relating to contents and receiving related information relating to the content information received at the content information receiving step from the information providing server; and displaying the related information received at the related information receiving step.

According to the embodiments of the present invention described above, an information processing program which allows a computer to execute: a content information receiving process for communicating with at least one or more broadcasting reception apparatus which receive contents and content information about the contents from a content provider, and receiving the content information from the broadcasting reception apparatus; a content information display process for displaying the content information received by the content information receiving process; a related information receiving process for communicating with an information providing server which manages related information relating to contents and receiving related information relating to the content information received by the content information receiving process from the information providing server; and a related information display process for displaying the related information received by the related information receiving process.

According to the embodiments of the present invention described above, an information providing server including: a related information storage unit which acquires related information from content provider which distributes contents and a sponsor relating to the contents so as to manage the related information; a related information request receiving unit which receives a related information request signal for requesting related information relating to content information displayed by a handheld terminal, from the handheld terminal which receives and displays content information about the contents distributed by the content provider from the broadcasting reception apparatus; a related information extraction unit which extracts the related information relating to the content information displayed by the handheld terminal from the related information storage unit according to the reception of the related information request signal; and a related information transmission unit which transmits the related information extracted by the related information extraction unit to the handheld terminal.

According to the embodiments of the present invention described above, a broadcasting reception apparatus including: a broadcasting signal processing unit which receives contents and content information about the contents from a content provider; a handheld terminal communication unit which communicates with a handheld terminal which transmits a request signal for requesting a predetermined process on the contents; and a content information control unit which transmits the content information received from the content provider to the handheld terminal via the handheld terminal communication unit according to the content information request signal from the handheld terminal.

According to the embodiments of the present invention described above, An information providing system including: at least one or more broadcasting reception apparatus which includes; a broadcasting signal processing unit which receives contents and content information about the contents from a content provider, a handheld terminal communication unit which communicates with a handheld terminal which transmits a request signal for requesting a process on the contents, and a content information control unit which transmits the content information received from the content provider to the handheld terminal via the handheld terminal communication unit according to the content information request signal from the handheld terminal, a handheld terminal which includes; a device communication unit which communicates with the broadcasting reception apparatus and receives the content information from the broadcasting reception apparatus, a content display unit which displays the content information received from the broadcasting reception apparatus thereon, a server communication unit which communicates with an information providing server which manages related information relating to the contents and receives the related information relating to the content information received by the device communication unit from the broadcasting reception apparatus, and a related information display unit which displays the related information received from the information providing server, and an information providing server which includes; a related information storage unit which acquires related information from the content provider and a sponsor relating to the contents so as to manage the related information, a related information request receiving unit which receives a related information request signal for requesting related information relating to content information displayed by the handheld terminal from the handheld terminal, a related information extraction unit which extracts related information relating to the content information displayed by the handheld terminal from the related information storage unit according to the reception of the related information request signal, and a related information transmission unit which transmits the related information extracted by the related information extraction unit to the handheld terminal.

According to the embodiments of the present invention described above, there is provided a new and improved handheld terminal, an information providing method, an information processing program, an information providing server, a broadcasting reception apparatus and an information providing system which display content information received from the broadcasting reception apparatus and various related information relating to the contents received from the information providing server so as to improve operability of user's predetermined processes such as viewing, selection, timer recording of the contents and viewing of related information.

BRIEF DESCRIPTION OF THE DRAWINGS

FIG. 1 is a conceptual diagram illustrating a usage example of a handheld terminal according to one embodiment of the present invention.

DETAILED DESCRIPTION OF THE PREFERRED EMBODIMENTS

Figure 2:
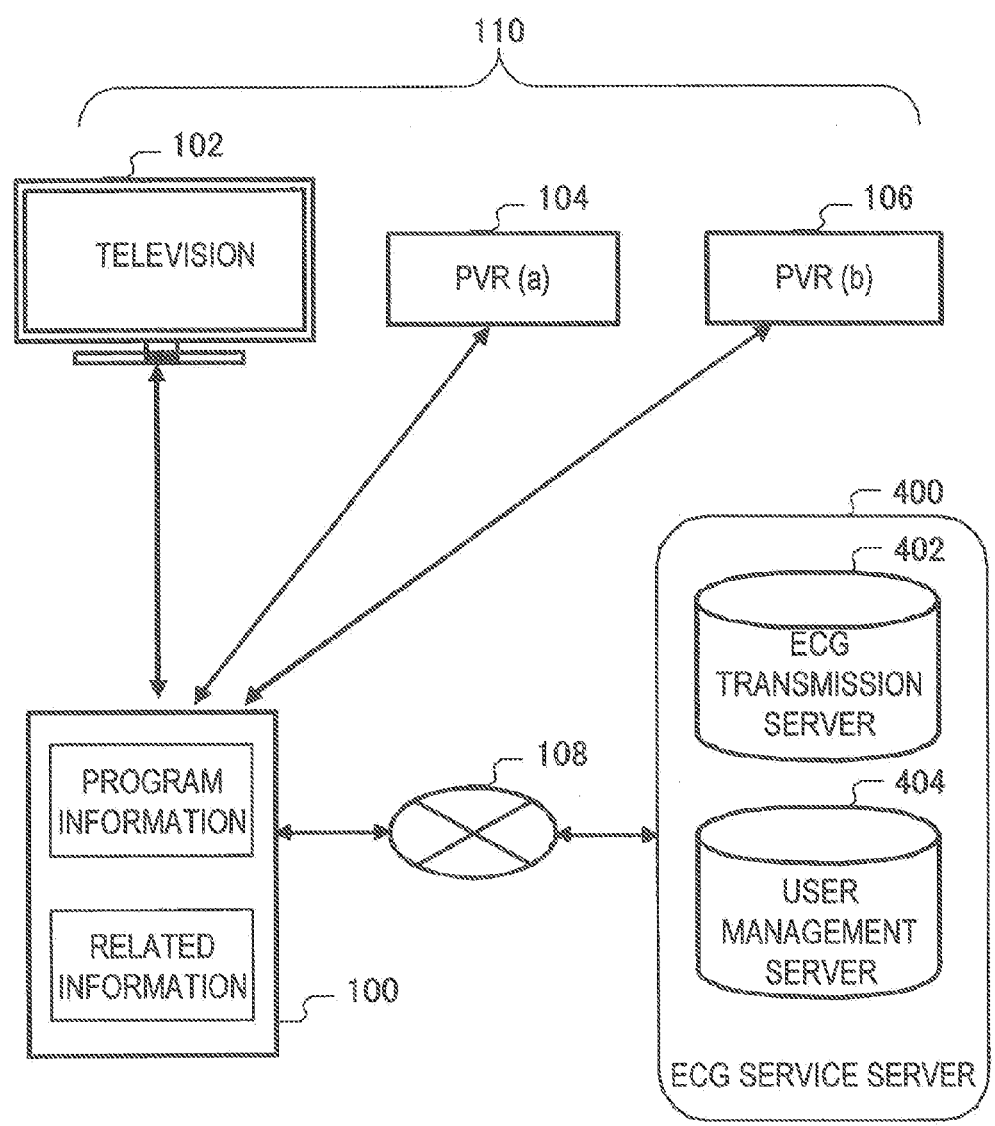
FIG. 2 is a conceptual diagram illustrating an outline of a system using a remote controller 100 according to the embodiment.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

The preferred embodiments are described in the following order.
1. Outline of the Embodiment of the Present Invention
2. Outline of System Using Remote Controller 100 according to One Embodiment
3. Configuration of Service System 300
   3-1. Content Provider 302
   3-2. Sponsor 304
   3-3. ECG Service Provider 306
   3-4. ECG Service Server 400
   3-4-1. User Management Server 404
   3-4-2. ECG Transmission Server 402
   3-5. Remote Controller 100
   3-6. Broadcasting Reception Apparatus 110
4. Various Processes and Display Examples of the Remote Controller 100
   4-1. Registration of Device Information about the Broadcasting Reception Apparatus 110
   4-2. Registration of Profile Information
   4-3. Acquisition of EPG SI and ECG Information
5. Process Sequence
   5-1. Initial Setting Process
   5-2: Acquisition of EPG SI and ECG Information
6. Process Flow of the Remote Controller 100 according to User Operation (1. Outline of the Embodiment of the Present Invention)

Before details of a handheld terminal according to one embodiment of the present invention are described, the outline of the embodiment of the present invention is described. As described above, according to the development of the broadcasting techniques in recent years, functions which are provided to televisions, recording/reproducing devices and the like become diversified. On the other hand, in order to execute such diversified functions provided to the televisions, the recording/reproducing devices and the like, users should operate operation buttons provided to remote controller at hand. In this case, for example, the users allow menus corresponding to the various functions to be displayed on television screens, so as to be capable of operating the remote controllers at hand according to information and instructions displayed on the television screens.

However, the users should operate the various buttons provided to the remote controllers at hand so as to select a command button or slide a program guide displayed on the television screens. That is to say, remote controllers in the past were nothing more than devices for transmitting predetermined instructions to televisions, recording/reproducing apparatus and the like according to various information and menus displayed on television screens.

On the contrary, a handheld terminal according to an embodiment of the present invention displays content information about programs and various related information relating to displayed contents so as to be capable of providing operational facility and simplicity of viewing, selection, reproduction and timer recording of program contents and acquisition of related information.

Concretely, the handheld terminal according to the embodiment bidirectionally communicates with a broadcasting reception apparatus such as a television so as to be capable of receiving EPG SI (Electronic Program Guide Service Information) received from a content provider such as a broadcasting station by the broadcasting reception apparatus. As a result, the handheld terminal according to the embodiment can display information about contents receivable by the broadcasting reception apparatus on a display provided to the handheld terminal based on the received EPG SI.

The handheld terminal according to the embodiment is connected to an ECG (Electronic Contents Guide) service server via a communication network such as the Internet so as to be capable of receiving various ECG information about the contents. The ECG information is various information including information relating to contents, such as details of contents, information about performers, information about WEB (World Wide Web) page, sales information about related products and information about sponsors of contents. As a result, the handheld terminal according to the embodiment can display not only information about contents receivable by the broadcasting reception apparatus but also various related information relating to the contents on the display of the handheld terminal based on the ECG information received from the ECG service server.

The ECG service server can manage contents viewed by a user, contents with timer recording being set, viewed ECG information and information about purchased products as user's contents preference information. With the information, the handheld terminal according to the embodiment can display only information about predetermined contents and related information on the display of the handheld terminal based on the user's contents preference information managed by the ECG service server. That is to say, only information about contents that matches with the user's preference in the information about a plurality of contents to be broadcasted in the future received by the broadcasting reception apparatus can be displayed.

With the above characteristics, the user can select contents or set timer recording based on the content information displayed on the display of the handheld terminal. Further, the user can view various related information relating to the contents displayed on the display of the handheld terminal, purchase products and connect to Web pages. As a result, the user does not have to operate a remote controller at hand in order to operate menus displayed on the screen of the broadcasting reception apparatus, and thus can easily view, select, reproduce and set timer recording the program contents, and acquire related information.

FIG. 1 is a conceptual diagram illustrating a usage example of the handheld terminal according to the embodiment of the present invention. As shown in FIG. 1, a user currently views a soccer program on a screen of a television. At this time, program information is displayed on the handheld terminal according to the embodiment based on EPG SI received from the television. With this information, the user can recognize programs which can be currently viewed, programs to be broadcasted later, and programs which match with user's preference information. Further, ECG information received from the ECG service server is displayed on the handheld terminal. In the example shown in FIG. 1, since the content information about the soccer is displayed, related information relating to sales of soccer tickets received from the ECG service server is displayed. As described above, the handheld terminal according to the embodiment is not an apparatus only for transmitting predetermined instructions to information processing terminals such as televisions for displaying various information and menus but is also capable of providing various information about broadcasted contents to the user.

Details of the handheld terminal according to the embodiment of the present invention having such a characteristic are described below. The description of the embodiment below refers to a remote controller 100, which can transmit various instructions to broadcasting reception apparatus such as a television, a recording/reproducing device and the like, as one example of the handheld terminal according to the embodiment of the present invention, but the present invention is not limited to this. The present invention may be, for example, information processing apparatus such as cell phones, PDA (Personal Digital Assistants) and portable game machines which have a display function such as a display and can bidirectionally communicate with the broadcasting reception apparatus. Also in the following description, predetermined programs distributed from a television station are assumed as contents to be displayed and the like by the remote controller 100, but the present invention is not limited to this. That is to say, the contents include various video and audio contents distributed by data broadcasting stations, video distributing companies and the like as well as programs distributed from television stations.

(2. Outline of System Using the Remote Controller 100 According to One Embodiment)

An outline of a system using the remote controller 100 according to one embodiment of the present invention is described below. FIG. 2 is a conceptual diagram illustrating the outline of the system using the remote controller 100 according to the embodiment.

As shown in FIG. 2, the remote controller 100 according to the embodiment can bidirectionally communicate with broadcasting reception apparatus 110 such as a television 102, a PVR (a) 104 (PVR: Personal Video Recorder) and PVR (b) 106. As a result, the remote controller 100 can acquire EPG SI, which is received from content providers such as broadcasting stations by the broadcasting reception apparatus such as the TV 102, the PVR (a) 104 and the PVR (b) 106, from the broadcasting reception apparatus. PVR may be various recording/reproducing devices such as a hard disc recorder and a DVD (Digital Versatile Disc) recorder, and a set top box, for example, and is an apparatus capable of receiving contents from the broadcasting stations and the like. The number and the types of the broadcasting reception apparatus 110 communicable with the remote controller 100 are not limited to the example shown in FIG. 2.

As shown in FIG. 2, the remote controller 100 can bidirectionally communicate with an ECG service server 400 via a communication network such as the Internet 108. The ECG service server 400 is a server managed by an ECG service provider which records, manages, provides and distributes various ECG information about programs. The ECG service server 400 mainly includes an ECG transmission server 402 which transmits ECG information according to a request form the remote controller 100, and a user management server 404 which manages contents preference information of a user owning the remote controller 100 and the like. The remote controller 100 bidirectionally communicates with the ECG service server 400 so as to be capable of receiving various ECG information from the ECG service server 400.

As described above, the remote controller 100 can receive EPG SI from the broadcasting reception apparatus 110, and various ECG information from the ECG service server 400.

(3. Configuration of Service System 300)

Figure 3:
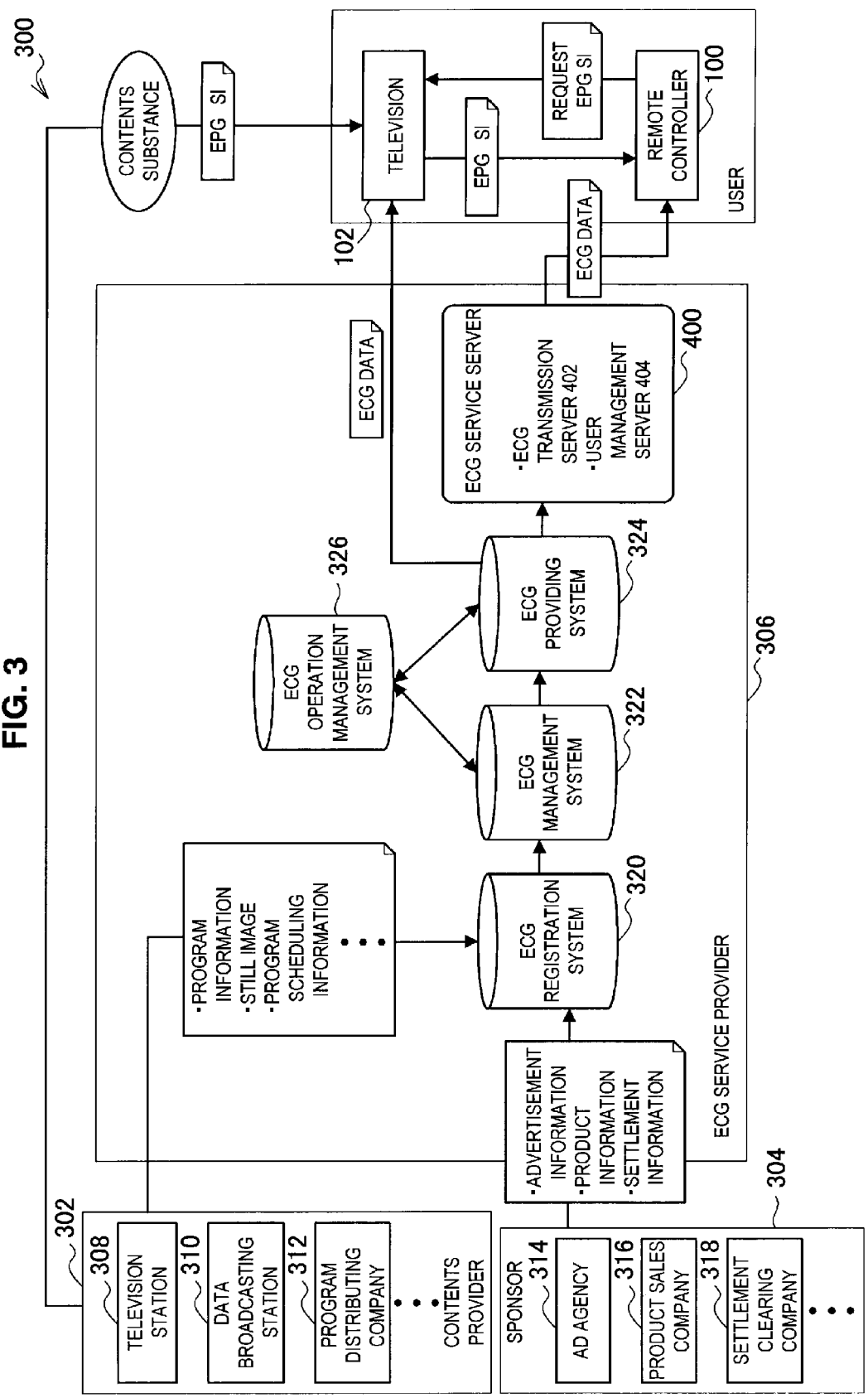
FIG. 3 is an explanatory diagram illustrating one example of an entire configuration of a service system 300 using the remote controller 100 according to the embodiment capable of transmitting/receiving EPG SI and ECG information.

One example of an entire configuration of a service system (information providing system) 300 utilizing the remote controller 100 according to the embodiment capable of transmitting/receiving EPG SI and ECG information is described below based on the abovementioned outline of the system with reference to FIG. 3. FIG. 3 is an explanatory diagram illustrating one example of the entire configuration of the service system 300 utilizing the remote controller 100 according to the embodiment capable of transmitting/receiving EPG SI and ECG information.

As shown in FIG. 3, the service system 300 mainly includes a content provider 302, a sponsor 304, an ECG service provider 306, and the television 102 and the remote controller 100 used by a user. FIG. 3 shows only the television 102 as the broadcasting reception apparatus 110 for convenience of the description, but the number, types and the like of the broadcasting reception apparatus 110 are not particularly limited. Components of the service system 300 are described in detail below.

(3-1. Content Provider 302)

The content provider 302 transmits content substance such as video and audio to the television 102 and the like. The content provider 302 includes providers which provide contents, such as a television station 308, a data broadcasting station 310, and a broadcasting distributing company 312. The content provider 302 manages various program information such as EPG information, program scheduling information, Cue sheet (progression schedule of program) information, program format (pattern for providing title, CM and main program) information, photograph/logo information, program promotion information, and copyright information. The content provider 302 distributes video/audio information of program, data broadcasting information and EPG-SI information to the television 102. As a result, the television 102 can display contents received from the content provider 302, and also can display an electronic program guide based on EPG-SI according to a user's instruction. The content provider 302 provides various information about the contents also to the ECG service provider 306. As a result, the ECG service provider 306 can manage, create and distribute ECG information about various contents distributed by the content provider 302.

The abovementioned configuration of the content provider 302 is one example for description of the embodiment, and the present invention is not limited to this. That is to say, the content provider 302 can naturally include various other providers which distribute contents and the like, and can naturally manage various program information and the like other than the above ones.

(3-2. Sponsor 304)

The sponsor 304 includes, for example, an advertisement agency 314, a sales company 316 and a settlement company 318 which provide merchant services such as advertisements, products and settlements. The sponsor 304 provides various related information such as advertisement information, product information and settlement information, for example, to the ECG service provider 306. In response to this, the ECG service provider 306 associates the program information acquired from the content provider 302 with the related information acquired from the sponsor 304 so as to be capable, for example, of creating, managing and distributing the ECG information about programs.

The configuration of the sponsor 304 is one example for the description of the embodiment, and the configuration is not limited to this. That is to say, the sponsor 304 may naturally include, for example, companies which provide other various information such as event information, travel information, financial information and the like.

(3-3. ECG Service Provider 306)

The ECG service provider 306 associates program information acquired from the content provider 302 with related information acquired from the sponsor 304 so as, for example, to create, manage and distribute ECG information about programs. As shown in FIG. 3, the ECG service provider 306 mainly includes an ECG registration system 320, an ECG management system 322, an ECG providing system 324, an ECG operations management system 326, and an ECG service server 400. These respective functions of the ECG service provider 306 are described in detail below.

(ECG Registration System 320)

The ECG registration system 320 registers program information provided from the content provider 302, related information provided from the sponsor 304, and the like as ECG information. As described above, the content provider 302 provides various information about programs such as details, performers, program schedule, program format and Cue sheet of programs. The related information provided by the sponsor 304 includes various information such as advertisement information, product information and settlement information. Therefore, the ECG registration system 320 can register various information about programs distributed from the content provider 302 to the television 102 and the like as ECG information. The ECG registration system 320 can, for example, add identification information or attribute information representing information attribute to the ECG information to be registered, but since the embodiment is not characterized by an ECG information creating method, details are not provided here.

(ECG Management System 322)

The ECG management system 322 associates various ECG information registered by the abovementioned ECG registration system 320 with contents distributed by the content provider 302 so as to manage them as, for example, an ECG unit. The ECG information includes various information about predetermined programs as described above. The ECG management system 322, therefore, associates various contents distributed by the content provider 302 with at least one or more pieces of ECG information about the contents so as to manage them.

The ECG unit managed by the ECG management system 322, therefore, includes at least one or more pieces of ECG information about the various contents distributed by the content provider 302. Examples of the ECG information associated with a certain program are various information relating to the program including detailed information of the program contents, performer information, still image information of the program and the performers, sales information of products relating to the performers, sponsor information of the program, Web page information of the program, information for introducing related programs, and the like.

The ECG management system 322 can create a distribution schedule for distributing an ECG unit based on program scheduling information, Cue sheet information, and the like provided by the content provider 302.

The ECG management system 322 can associate ECG information with contents distributed by the content provider 302 from various viewpoints, but the present invention is not characterized by the association of ECG information and is not limited to a particular way of association. In addition, the ECG management system 322 does not necessarily have to associate the predetermined contents with plural pieces of ECG information and manage them by a unit unlike the abovementioned ECG unit. That is to say, the ECG management system 322 is not limited particular way of association and way of management as long as it can associate contents distributed by the content provider 302 with the ECG information relating to the contents so as to manage them.

(ECG Providing System 324)

The ECG providing system 324 transmits ECG information managed by the ECG management system 322 to the television 102 according to the distribution schedule created by the ECG management system 322. As a result, even when the remote controller 100 according to the embodiment is not used, the user operates various buttons provided to the remote controller at hand according to, for example, a menu displayed on the television 102 so as to be capable, for example, of viewing ECG information. On the other hand, in the embodiment, the ECG service server 400 is provided, so that the ECG information and the like can be transmitted to the remote controller 100. Details of this are described later.

(ECG Operations Management System 326)

The ECG operation management system 326 controls the ECG management system 322, the ECG providing system 324, and the like so as to manage all operations of the various systems in the ECG service provider 306. The ECG operation management system 326 can instruct transmission of ECG information to the ECG providing system 324, or the like, based on, for example, the distribution schedule of the ECG information created by the ECG service management system 322.

(3-4. ECG Service Server 400)

The abovementioned ECG service provider 306 can associate the various ECG information relating to contents distributed by the content provider 302 with the contents so as to manage them by means of the various systems provided to the ECG service provider 306. Also, the ECG service provider 306 can transmit the ECG information relating to the contents to the television 102 according to the distribution of the contents to the television 102 by means of the content provider 302. However, in order, for example, to view the ECG information transmitted to the television 102 as described above, the user should operate the remote controller at hand in order to operate a menu displayed on a screen of the television 102, and thus convenience is not good.

On the contrary, in the embodiment, the ECG service provider 306 includes the ECG service server 400 which can transmit ECG information and the like to the remote controller 100.

The ECG service server 400 mainly includes the ECG transmission server 402 which transmits ECG information according to a request from the remote controller 100, and the user management server 404 which manages user's preference information owned by the remote controller 100, and the like.

Figure 4:
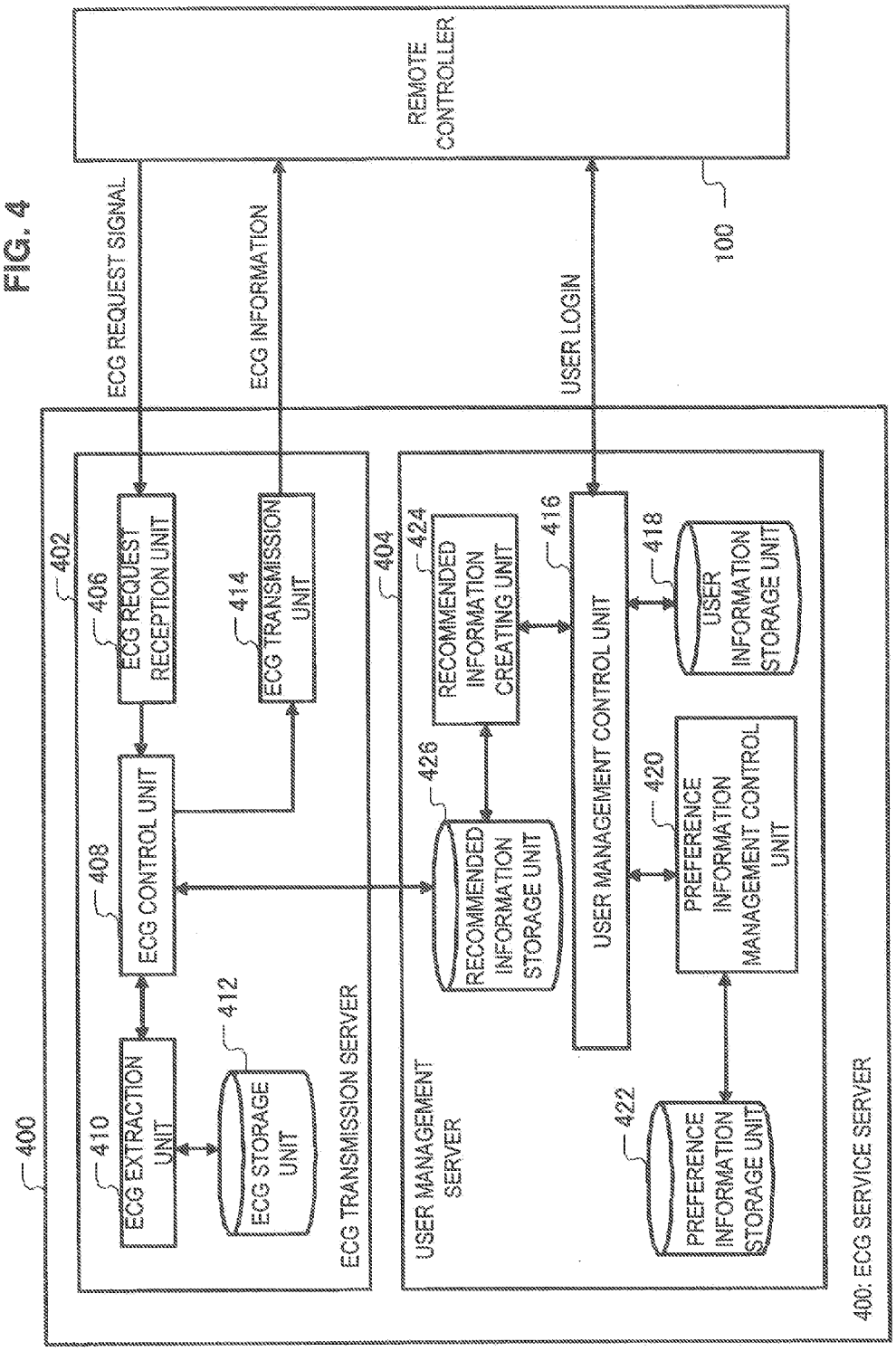
FIG. 4 is a block diagram illustrating a functional configuration of an ECG service server 400 provided to an ECG service provider 306 in the embodiment.

FIG. 4 is a block diagram illustrating a functional configuration of the ECG service server 400. As shown in FIG. 4, the ECG service server 400 mainly includes the ECG transmission server 402 and the user management server 404. The functions of the ECG transmission server 402 and the user management server 404 included in the ECG service server 400 are described in detail below.

(3-4-1. User Management Server 404)

As shown in FIG. 4, the user management server 404 mainly includes a user management control unit 416, a user information storage unit 418, a preference information management control unit 420, a preference information storage unit 422, a recommended information creating unit 424 and a recommended information storage unit 426.

The user management server 404 manages, for example, user's contents preference information such as profile information, program viewing history information and timer recording history information of a user who owns the remote controller 100. The user management server 404 may further create and manage recommended information for extracting ECG to be provided to the user based on the user's preference information.

The user management control unit 416 controls various components of the user management server 404 described below so that the preference information and recommended information are created and managed according to the user's request.

The user information storage unit 418 manages profile information set by the user via the remote controller 100. The profile information is various information relating to program viewing that is set by users and is specific to respective users, such as users' interesting genre, interesting talent, artists, broadcasting station, viewing time. The user can register profile information, for example, on an operation screen of the remote controller 100. The user can register and edit profile information, for example, on a Web page set up by the ECG service provider 306. The user information storage unit 418 stores profile information thus registered and edited by the user therein. A specific serial number is set to the remote controller 100. Therefore, the user information storage unit 418 can store serial numbers and profile information while associated to each other, and thus can manage profile information of each user using each of a plurality of remote controllers 100.

The preference information management control unit 420 manages program preference information of a user using the remote controller 100. Details are described later, but, for example, when the user selects a predetermined program, sets timer recording of a predetermined program, purchases a product or the like, based on predetermined ECG information, the remote controller 100 according to the embodiment transmits these pieces of information to the user management server 404. The preference information management control unit 420 records information about genres, performers and broadcasting station of programs viewed or the like by the user using the remote controller 100 as preference information into the preference information storage unit 422 based on the information transmitted from the remote controller 100. The preference information management control unit 420 manages viewing history and the like associated with the serial number of the remote controller 100, so as to be capable of managing preference information of each user using each of a plurality of remote controllers 100.

A recommended information creating unit 424 creates recommended information about genre, performers and broadcasting station to be recommended to the users for each remote controller 100 based on the abovementioned preference information and the profile information, and records the information in the recommended information storage unit 426. When recommended information for the predetermined remote controller 100 is created for example, the recommended information creating unit 424 extracts profile information corresponding to the serial number of the remote controller from the user information storage unit 418, and extracts preference information corresponding to the serial number from the preference information storage unit 422. Thereafter, the recommended information creating unit 424 creates recommended information corresponding to the serial number based on the profile information and the preference information.

The recommended information creating unit 424 can create recommended information for each of the remote controllers 100 in this manner. In addition, every time when viewing history, timer recording setting history, and the like are received from the remote controller 100, or/and profile information is edited by a user, the recommended information creating unit 424 can update the recommended information about the remote controller 100. The recommended information created in such a manner is recorded in the recommended information storage unit 426, whereby the ECG transmission server 402, described later, can transmit only the ECG information recommended to the user using the remote controller 100 to the remote controller 100 based on the recommended information.

The recommended information creating unit 424 can create recommended information from various viewpoints. The recommended information creating unit 424 can create recommended information, for example, for each specified time zone and each day of the week. As a result, the ECG service server 400 can provide recommended ECG information suitable for a time zone, a day of the week, or the like to the remote controller 100. Also, the recommended information creating unit 424 can create recommended information, for example, while weighing on specified profile information, preference information or the like. Further, the recommended information creating unit 424 can create recommended information, for example, with related information recommended by a predetermined sponsor 304 affiliating with the ECG service provider 306 being added.

The recommended information creating unit 424 can create recommended information from various viewpoints. For example, the ECG service provider 306 or the user can set any viewpoint from which recommended information is created.

(3-4-2. ECG Transmission Server 402)

As shown in FIG. 4, the ECG transmission server 402 mainly includes an ECG request reception unit 406, an ECG control unit 408, an ECG extraction unit 410, an ECG storage unit 412 and an ECG transmission unit 414.

The ECG request reception unit 406 receives an ECG request signal from the remote controller 100. Details are described later, but the remote controller 100 receives EPG SI from the television 102, and then transmits an ECG request signal to the ECG transmission server 402. The ECG request signal is for requesting transmission of ECG information associated with a program corresponding to the EPG SI. The ECG request reception unit 406 receives the ECG request signal to be transmitted from the remote controller 100 via a communication network such as the Internet. After that, the ECG request reception unit 406 transmits the received ECG request signal to the ECG control unit 408. The ECG request reception signal 406 functions as a related information request receiving unit of the present invention.

The ECG control unit 408 controls the transmission of the ECG information to the remote controller 100 according to the reception of the ECG request signal from the remote controller 100. That is to say, when the ECG control unit 408 receives the ECG request signal from the ECG request reception unit 406, it instructs the ECG extraction unit 410 to extract the ECG information. Details are described later, but the remote controller 100 occasionally transmits a filtering request signal to the ECG service server 400 so that only EPG SI which matches with user's preference is extracted (filtered) from a plurality of EPG SI received from the television 102. In this case, the ECG control unit 408 can filter EPG SI which matches with preference of the user using the remote controller 100 based on the abovementioned recommended information managed by the user management server 404.

The ECG extraction unit 410 extracts ECG information to be transmitted to the remote controller 100 from the ECG information stored in the ECG storage unit 412 according to the instruction from the ECG control unit 408. When the ECG control unit 408 executes the abovementioned filtering process, the ECG extraction unit 410 extracts only ECG information relating to the filtered EPG SI from the ECG storage unit 412. The ECG extraction unit 410 functions as a related information extraction unit of the present invention.

The ECG storage unit 412 stores the ECG information managed by the ECG service provider 306. The ECG storage unit 412 can store ECG information which is created by the abovementioned ECG registration system 320 and is associated with predetermined contents by the ECG management system 322. The ECG storage unit 412 functions as a related information storage unit of the present invention.

The ECG transmission unit 414 transmits the ECG information extracted by the ECG extraction unit 410 to the remote controller 100 which has transmitted the ECG request signal. When the ECG control unit 408 executes the abovementioned filtering process, the ECG transmission unit 414 can transmit the filtered EPG SI to the remote controller 100. The ECG transmission unit 414 functions as a related information transmission unit of the present invention.

As described above, the ECG service server 400 can transmit the ECG information to the remote controller 100 according to the reception of the ECG request signal from the remote controller 100. Also, the ECG service server 400 can create recommended information for the remote controller 100 based on user's profile information and preference information based on viewing history. As a result, when the remote controller 100 requests the filtering process on the EPG SI, the ECG service server 400 can transmit only EPG SI and ECG information which match with preference of the user using the remote controller 100 to the remote controller 100. Details of the ECG information transmitting/receiving process between the remote controller 100 and the ECG service server 400 are described later in the processing sequence.

(3-5. Remote Controller 100)

Figure 5:
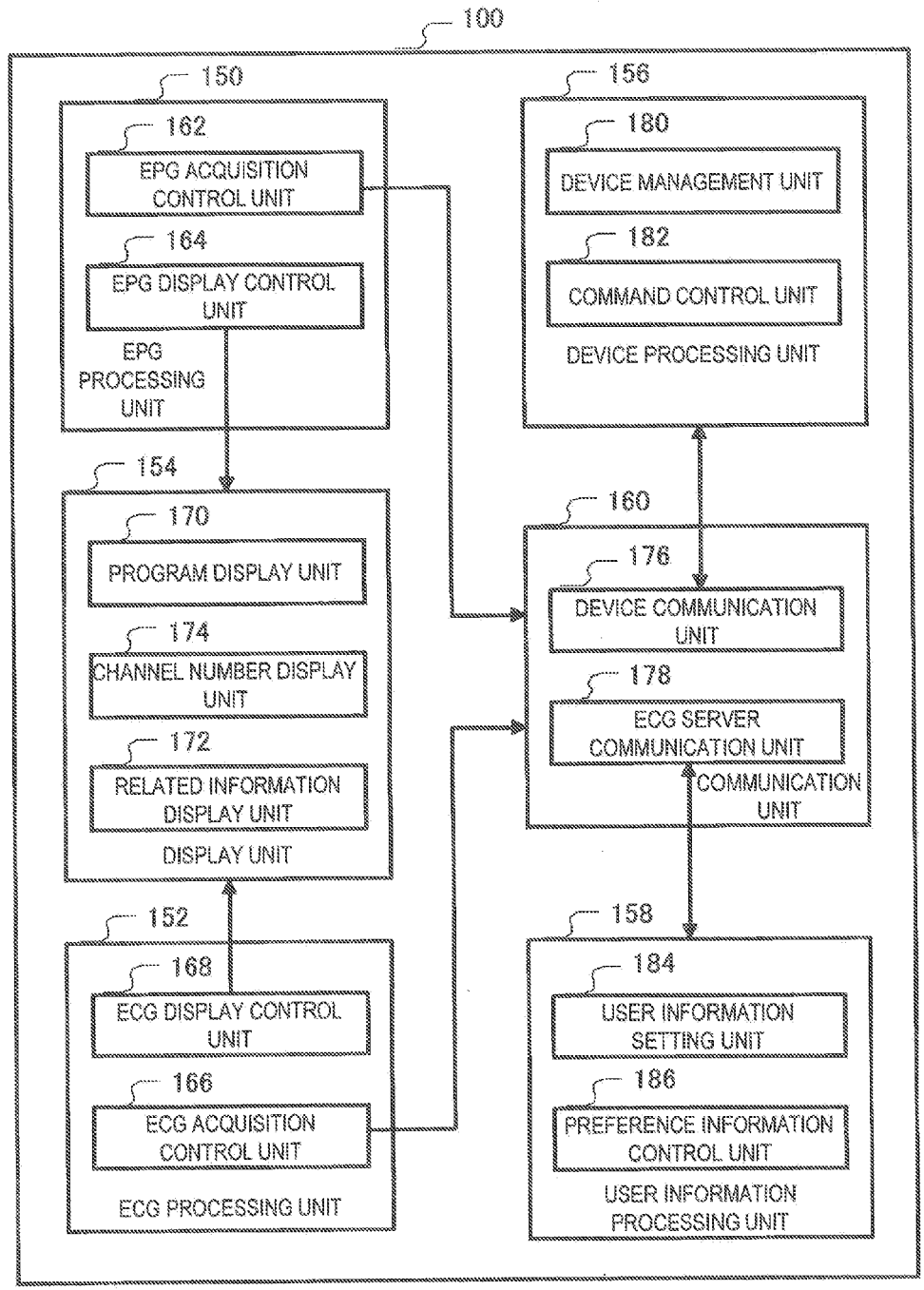
FIG. 5 is a block diagram illustrating a functional configuration of the remote controller 100 according to the embodiment.

The remote controller 100 which can receive ECG information or the like from the abovementioned ECG service server 400 is described below. FIG. 5 is a block diagram illustrating a functional configuration of the remote controller 100 according to the embodiment.

As shown in FIG. 5, the remote controller 100 mainly includes an EPG processing unit 150, an ECG processing unit 152, a display unit 154, a communication unit 160, a device processing unit 156 and a user information processing unit 158.

(EPG Processing Unit 150)

The EPG processing unit 150 controls reception of EPG SI from the television 102 and display of program information based on the EPG SI. As shown in FIG. 5, the EPG processing unit 150 mainly includes an EPG acquisition control unit 162 and an EPG display control unit 164.

The EPG acquisition control unit 162 controls the reception of EPG SI from the television 102. As described above, the remote controller 100 can receive EPG SI from the television 102, and can display program information based on the received EPG SI. In order to realize this, the EPG acquisition control unit 162 controls the device communication unit 176 so that EPG SI is received from the television 102. The EPG acquisition control unit 162 can control the device communication unit 176 so that EPG SI about currently broadcasting programs, programs to be broadcasted next, programs to be broadcasted today or programs to be broadcasted during a week, for example, is received from the television 102.

The EPG display control unit 164 displays program information on the program display unit 170 based on the EPG SI received from the television 102. As described above, the remote controller 100 can receive EPG SI about currently broadcasting programs, programs to be broadcasted next, programs to be broadcasted today and programs to be broadcasted during a week from the television 102. Therefore, the EPG display control unit 164 can sequentially display currently broadcasting programs, programs to be broadcasted next, programs to be broadcasted today and programs to be broadcasted during a week, for example, on the program display unit 170. A display example of the program information on the program display unit 170 is described later.

(ECG Processing Unit 152)

The ECG processing unit 152 controls reception of ECG information from the ECG service server 400 and display of related information based on the ECG information. As shown in FIG. 5, the ECG processing unit 152 mainly includes an ECG acquisition control unit 166 and an ECG display control unit 168.

The ECG acquisition control unit 166 controls the reception of the ECG information from the ECG service server 400. The remote controller 100 can display not only the program information based on the EPG SI received from the television 102 but also the various related information relating to the program, as described above. In order to realize this, the ECG acquisition control unit 166 controls an ECG server communication unit 178 so that the ECG server communication unit 178 receives ECG information from the ECG service server 400. As a result, the ECG acquisition control unit 166 can control the ECG server communication unit 178 so that, for example, the ECG server communication unit 178 receives ECG information relating to a program corresponding to EPG SI received from the television 102 from the ECG service server 400.

The ECG display control unit 168 controls display of the ECG information received from the ECG service server 400. The remote controller 100 can receives the ECG information relating to the program corresponding to the EPG SI received from the television 102 from the ECG service server 400 as described above. Therefore, the ECG display control unit 168 can display, for example, ECG information relating to a predetermined program displayed on the program display unit 170 on the related information display unit 172. A display example of the ECG information on the related information display unit 172 is described later.

(Display Unit 154)

The display unit 154 displays channel number, program information and ECG information. The display unit 154 is a display device, which may be an LCD (Liquid Crystal Display) or an organic EL (Electroluminescence) display, for example. Also the display unit 154 has a touch panel function, for example, so as to be capable of accepting operational input from the user. As shown in FIG. 5, the display unit 154 mainly includes a program display unit 170, a related information display unit 172 and a channel number display unit 174.

The program display unit 170 displays program information according to an instruction of the EPG display control unit 164. The program display unit 170, for example, can sequentially display currently broadcasting programs viewable on the television 102, programs to be broadcasted next, programs to be broadcasted today and programs to be broadcasted during a week. The program display unit 170 functions as a content display unit of the present invention.

The related information display unit 172 displays ECG information according to an instruction of the ECG display control unit 168. The related information display unit 172, for example, can sequentially display pieces of ECG information relating to a program being displayed on the program display unit 170.

The channel number display unit 174 displays channel numbers corresponding to the content provider 302 including the television station 308 viewable on the television 102. The channel number display unit 174 can be set to display only a channel number, for example, when the power of the television 102 is OFF or at a time zone where the user does not watch the television 102.

The program information, the ECG information and the channel numbers displayed on the display unit 154 by means of the respective components are examples for describing the embodiment, and the present invention is not limited to them. For example, operation icons corresponding to the respective functions provided to a normal remote controller can be naturally displayed on the display unit 154. The functions include a cross key in order that the user operates the remote controller 100 and a slide bar in order that the user adjusts a volume. The display unit 154 can switch the display of the program display unit 170, the related information display unit 172 and the channel number display unit 174 or simultaneously displays them appropriately according to a user's viewing condition, an EPG SI receiving condition an ECG information receiving condition, and the like. A display example of the program information, the ECG information and the channel numbers displayed on the display unit 154 is described later.

(Device Processing Unit 156)

The device processing unit 156 performs process such as initially setting of the connection with the broadcasting reception apparatus 110 including the television 102, command instruction to the broadcasting reception apparatus 110. As shown in FIG. 5, the device processing unit 156 mainly includes a device management unit 180 and a command control unit 182.

The device management unit 180 manages device information about the broadcasting reception apparatus 110 communicable with the remote controller 100. The device management unit 180 can manage various information, for example, types of receiving media, a receiving area, channels (broadcasting stations) receivable by the broadcasting reception apparatus 110 and presence/non-presence of a recording function.

The command control unit 182 controls transmission of various request signals to the broadcasting reception apparatus 110. For example, when the user selects a program to be displayed on the display unit 154, the command control unit 182 controls the device communication unit 176 so that a signal for requesting the switching of channels is transmitted to the broadcasting reception apparatus 110.

(User Information Processing Unit 158)

The user information processing unit 158 controls setting of information about the user using the remote controller 100, transmission of preference information based on the user's viewing history to the ECG service server 400, and the like. As shown in FIG. 5, the user information processing unit 158 mainly includes a user information setting unit 184 and a preference information control unit 186.

The user information setting unit 184 manages profile information specific to the user using the remote controller 100. Normally, preference in program viewing varies according to users using the remote controllers 100. The user management server 404 provided to the ECG service server 400 can manage profile information for each remote controller (each user). The user can register and edit profile information via the display unit 154 of the remote controller 100 or a Web page on the Internet. The user information setting unit 184 controls the ECG server communication unit 178 so that the profile setting by the user is displayed on the display unit 154, user's input of profile information is accepted, or profile information is transmitted to the ECG service server 400.

The preference information control unit 186 controls the ECG server communication unit 178 so that the viewing history of the user using the remote controller 100, the setting history of the timer recording, and the viewing history of ECG information are transmitted as the contents preference information to the ECG service server 400. As a result, the user management server 404 provided to the abovementioned ECG service server 400 can manage the preference information for each remote controller (each user). The preference information control unit 186 can control the ECG server communication unit 178. As a result, for example, when the user selects a predetermined program, sets the timer recording or purchases a predetermined product or the like based on ECG information, these pieces of information are transmitted to the ECG service server 400 by the ECG server communication unit 178.

Details of the profile setting and the preference information transmitting process by the user are described later.

(Communication Unit 160)

The communication unit 160 is a communication interface, which communicates with at least one or more of the broadcasting reception apparatus 110 including the television 102 and the ECG service server 400, or the like. As shown in FIG. 5, the communication unit 160 mainly includes a device communication unit 176 and an ECG server communication unit 178.

The device communication unit 176 bidirectionally communicates with the broadcasting reception apparatus 110. The device communication unit 176, for example, can transmit a request signal of EPG SI to the broadcasting reception apparatus 110, or receive EPG SI from the broadcasting reception apparatus 110 according to an instruction from the EPG acquisition control unit 162. Also, the device communication unit 176, for example, can transmit a request signal for changing channels to the broadcasting reception apparatus 110 according to an instruction from the command control unit 182, or receive device information about the broadcasting reception apparatus 110 therefrom according to an instruction from the device management unit 180. A communication means between the device communication unit 176 and the broadcasting reception apparatus 110 is not limited to a specific communication standard as long as it can bidirectionally transmit/receive a signal. Furthermore, for example, a radio communication technique for a short distance communication such as Transfer Jet (registered trademark of Sony Corporation) standard can be utilized.

The ECG server communication unit 178 bidirectionally communicates with the ECG service server 400 via the communication network such as the Internet. The ECG server communication unit 178, for example, can transmit a request signal of ECG information to the ECG service server 400 or receive ECG information from the ECG service server 400 according to an instruction from the ECG acquisition control unit 166. Also the ECG server communication unit 178, for example, can transmit profile information and preference information to the ECG service server 400 according to an instruction from the user information processing unit 158.

The remote controller 100 has the above components, so as to be capable of acquiring EPG SI from the broadcasting reception apparatus 110 and displaying program information on the display unit 154. The remote controller 100 can acquire ECG information from the ECG service server 400 and can display related information relating to program. Further, the remote controller 100 can transmit profile information and preference information to the ECG service server 400. Detailed flows of these processes are described in the processing sequence later.

(3-6. Television 102 (the Broadcasting Reception Apparatus 110))

The broadcasting reception apparatus 110 receives a broadcasting signal or EPG SI from the content provider 302, and examples thereof are the television 102, the PVR (a) 104 and the PVR (b) 106 shown in FIG. 2. The following description mainly refers to the television 102 having a display which processes a video signal and an audio signal from a broadcasting signal and displays them as the broadcasting reception apparatus 110.

The television 102 is a broadcasting reception terminal which can receive programs, which are provided via various transmission paths, via an antenna, STB (Set Top Box), or the like. The various transmission paths, for example, include analog terrestrial broadcasting, digital terrestrial broadcasting, BS (Broadcast Satellite) analog broadcasting, BS digital broadcasting, CS (Communication Satellite) broadcasting, CATV broadcasting and optical fiber broadcasting.

Figure 6:
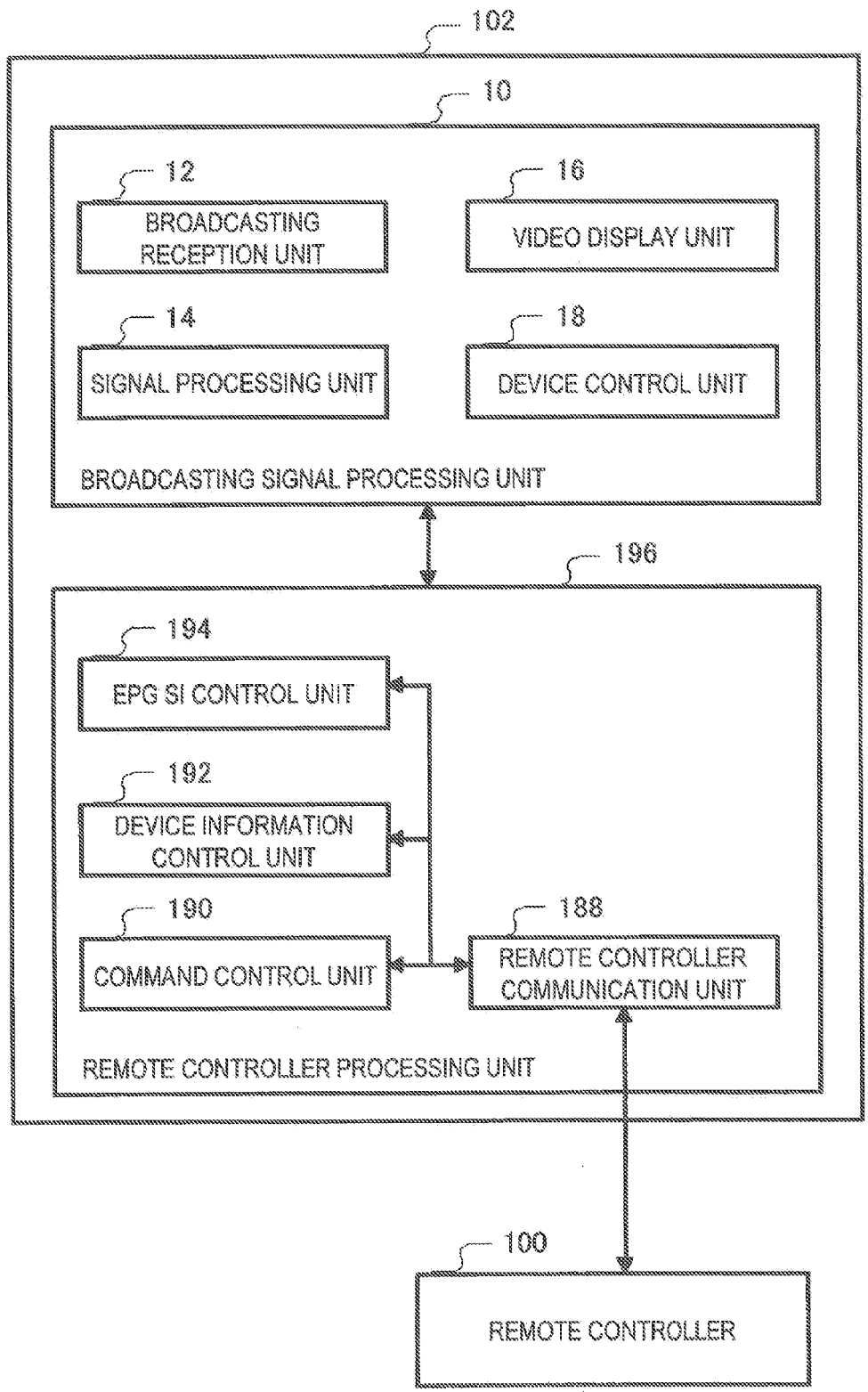
FIG. 6 is a block diagram illustrating a functional configuration of a television 102 in the embodiment.

FIG. 6 is a block diagram illustrating a functional configuration of the television 102. As shown in FIG. 6, the television 102 mainly includes a broadcasting signal processing unit 10 and a remote controller processing unit 196. The broadcasting signal processing unit 10 includes a broadcasting reception unit 12, a signal processing unit 14, a video display unit 16, a device control unit 18, and the like which are generally provided to the television. The components included in the broadcasting signal processing unit 10 are not limited to them, and thus various functions which are provided to normal televisions may be naturally added. Since the embodiment is characterized in that the television 102 has the remote controller processing unit 196, the remote controller processing unit 196 is mainly described below.

(Remote Controller Processing Unit 196)

The remote controller processing unit 196 bidirectionally communicates with the remote controller 100 so as to be capable of transmitting EPG SI and device information about the television 102 to the remote controller 100, and receiving a command signal for changing channels from the remote controller 100. As shown in FIG. 6, the remote controller processing unit 196 includes a remote controller communication unit 188, a command control unit 190, a device information control unit 192 and an EPG SI control unit 194.

The remote controller communication unit 188 bidirectionally communicates with the remote controller 100. The remote controller communication unit 188, for example, can receive a request signal of EPG SI from the remote controller 100, and transmit EPG SI to the remote controller 100 according to the reception of the request signal. Also, the remote controller communication unit 188, for example, can receive a command signal for changing channels from the remote controller 100, and transmit device information specific to the television 102 to the remote controller 100. The communication means between the device communication unit 176 of the remote controller 100 and the broadcasting reception apparatus 110 is not limited to a specific communication standard as long as it can bidirectionally transmit/receive a signal, as described above. Furthermore, for example, a radio communication technique for a short distance communication such as Transfer Jet (registered trademark of Sony Corporation) standard can be used. The remote controller communication unit 188 functions as a handheld terminal transmission unit of the present invention.

The command control unit 190 gives various commands such as the command for changing channels to the broadcasting signal processing unit 10 according to the command signal for changing channels received from the remote controller 100, for example. As a result, the user selects a program or the like to be displayed on the display unit 154 of the remote controller 100 so as to be capable of changing programs to be viewed on the television 102.

The device information control unit 192 manages various information specific to the television 102, such as types of receiving media, receiving area and presence/non-presence of the recording function, and makes a control so as to transmit the information to the remote controller 100 via the remote controller communication unit 188. For example, when the remote controller 100 carries out initial setting, the device information control unit 192 can transmit the various device information specific to the television 102 to the television 102 via the remote controller communication unit 188 according to a request form the remote controller 100.

The EPG SI control unit 194 controls so as to transmit EPG SI received from the content provider 302 to the remote controller 100 via the remote controller communication unit 188 according to a request signal of EPG SI receive from the remote controller 100. The EPG SI control unit 194, for example, can transmit EPG SI about currently broadcasting programs receivable by the television 102, programs to be broadcasted next, programs to be broadcasted today and program to be broadcasted during a week to the remote controller 100 via the remote controller communication unit 188. The EPG SI control unit 194 functions as a content information control unit of the present invention.

The above description mainly refers to the television 102 as the broadcasting reception apparatus 110, but the present invention is not limited to this. The broadcasting reception apparatus 110 may be a broadcasting reception apparatus, such as a personal computer, which can receive a broadcasting signal, or a recording/reproducing device such as PVR which receives a broadcasting signal and displays a video on a display provided to another external device.

(4. Various Processes by the Remote Controller 100 and the Display Example)

The details of the configuration of the service system 300 utilizing the remote controller 100 according to the embodiment are described above. The details of the various processes executed by the remote controller 100, and the display examples on the display unit 154 of the remote controller 100 at the time of executing the processes are described below.

(4-1. Registration of the Device Information about the Broadcasting Reception Apparatus 110)

First, details of the process for registering the device information about the broadcasting reception apparatus 110 communicable with the remote controller 100 are described. The registering process is for registering device information specific to the broadcasting reception apparatus 110 communicable with the remote controller 100. The broadcasting reception apparatus 110 normally has information specific to the device such as types of receivable reception media, a receiving area and presence/non-presence of the recording function. The remote controller 100 acquires the information specific to the device from the broadcasting reception apparatus 110, and gives a device ID to each of the broadcasting reception apparatus 110 so as to manage them. As a result, the remote controller 100 can recognize the information specific to the devices such as types of receivable reception media, receiving areas and presence/non-presence of the recording function based on the device IDs of each broadcasting reception apparatus 110. As a result, the remote controller 100, for example, can display only channel numbers corresponding to the broadcasting stations receivable by the broadcasting reception apparatus 110 on the display unit 154, and transmit a command signal for timer recording only to the broadcasting reception apparatus 110 having the recording function.

Figure 7:
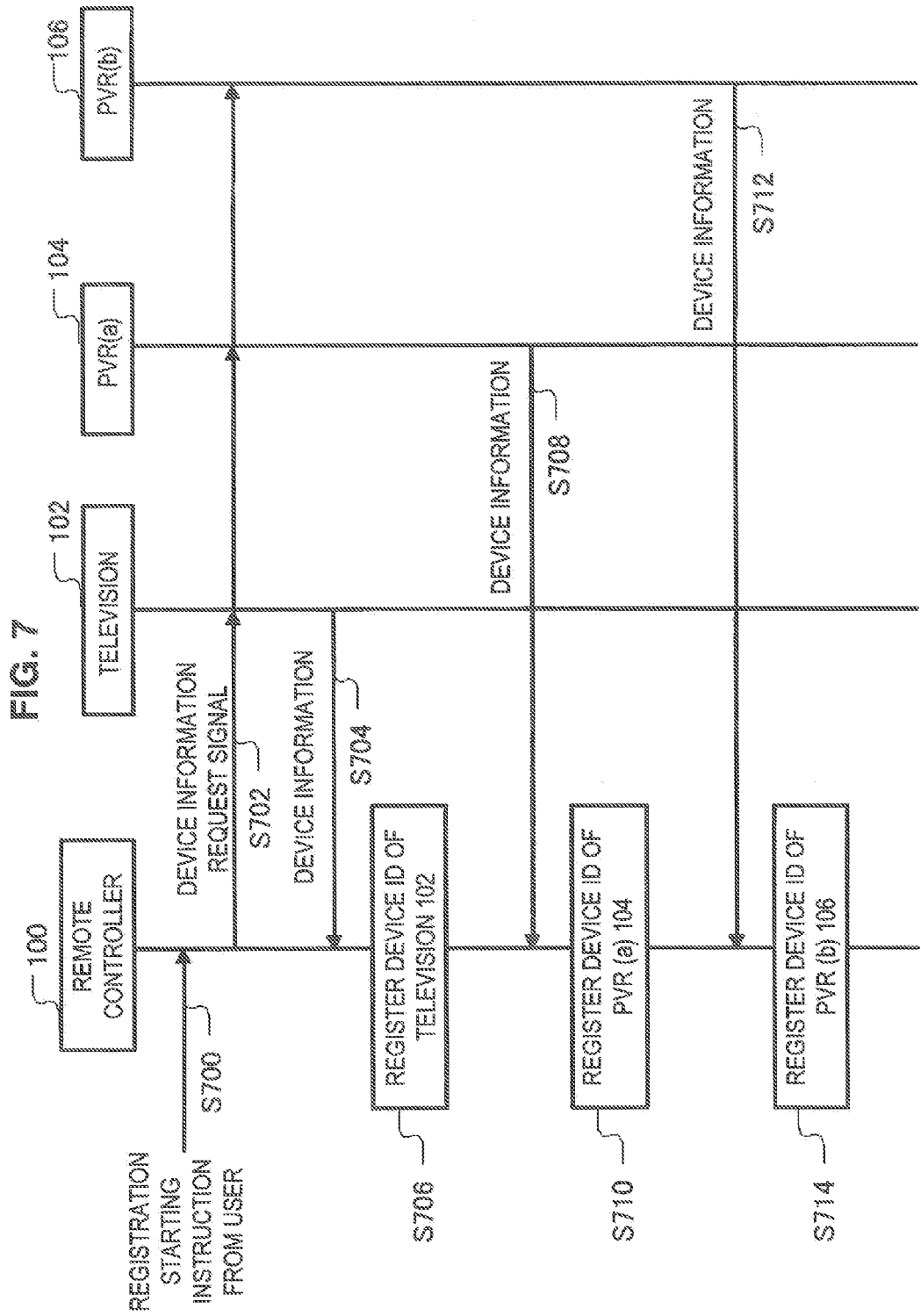
FIG. 7 is a sequence diagram illustrating one example of a process flow of the remote controller 100 and respective broadcasting reception apparatus 110 for registering device information about the broadcasting reception apparatus 110 in the embodiment.

The flow of the process for registering the device information about the broadcasting reception apparatus 110 is described below with reference to FIG. 7. FIG. 7 is a sequence diagram illustrating one example of the process flow of the remote controller 100 and the respective broadcasting reception apparatus 110 for registering the device information about the broadcasting reception apparatus 110.

As shown in FIG. 7, the process for registering the device information about the broadcasting reception apparatus 110 is started by a registration starting instruction from the user at step 700. For example, when the user starts using the remote controller 100, purchases a new broadcasting reception apparatus 100 or moves out and thus the receiving area of a broadcasting signal is changed, the process for registering the device information about the broadcasting reception apparatus 110 can be executed. Therefore, when the user selects an initial setting button or a device information registration starting button displayed on the display unit 154, the remote controller 100 start the registering process.

After receiving the instruction from the user, the remote controller 100 transmits a device information request signal to all the connectable broadcasting reception apparatus 110 at step 702. The device information request signal is transmitted by the device communication unit 176 provided to the remote controller 100. In the example shown in FIG. 7, the three broadcasting reception apparatus 110 including the television 102, the PVR (a) 104 and the PVR (b) 106 are arranged in a communicable range of the remote controller 100.

The respective broadcasting reception apparatus 110, which has received the device information request signal from the remote controller 100, transmits device information specific to the devices to the remote controller 100. The device information is transmitted by the remote controller communication units 188 provided to the respective broadcasting reception apparatus 110.

Figure 8:
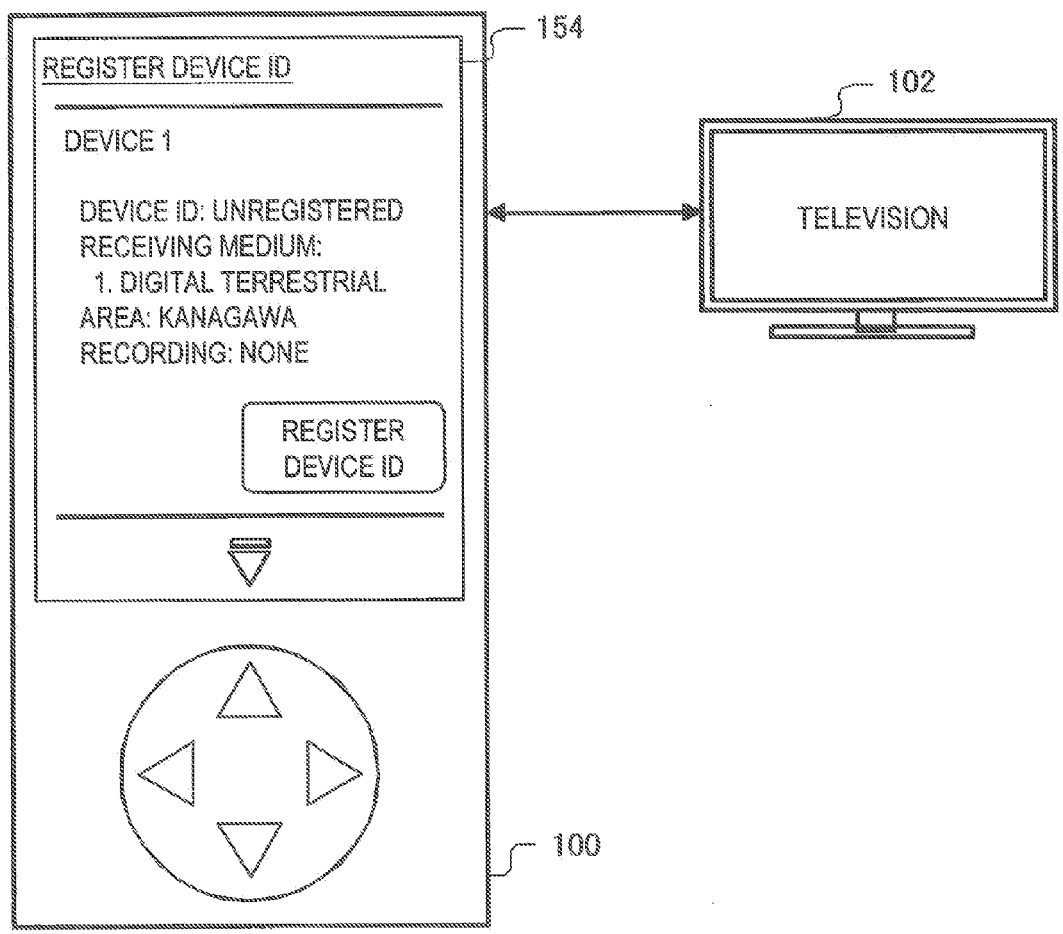
FIG. 8 is an explanatory diagram illustrating a display example of a display unit 154 for displaying the device information received from the television 102 in the embodiment.

In the example show in FIG. 7, the device information is transmitted from the television 102 at step 704. In response to this, the remote controller 100 displays the device information received from the television 102 on the display unit 154. FIG. 8 is an explanatory diagram illustrating a display example of the display unit 154 for displaying the device information received from the television 102.

As shown in FIG. 8, the device information received from the television 102 is displayed on the display unit 154. In the television 102 of the example shown in FIG. 8, the reception medium is a "digital terrestrial" medium, and the receiving area is "Kanagawa", and the recording function is "not provided". Since the remote controller 100 is connected to the television 102 for the first time, it is displayed that a device ID thereof is not registered. In this situation, when the user selects the device ID registering button displayed on the display unit 154, the remote controller 100 registers a device ID of the television 102 at step 706 shown in FIG. 7. As a result, the remote controller 100 can manage the device information about the connectable broadcasting reception apparatus 110 associated with the device IDs. The device IDs and the device information are registered and managed by the device management unit 180 provided to the remote controller 100.

Similarly, the remote controller 100, which has received the device information from the PVR (a) 104 at step 708, registers the device ID of the PVR (a) 104 at step 710. The remote controller 100, which has received the device information from the PVR (b) 106 at step 712, registers a device ID of the PVR (b) at step 714.

The remote controller 100 can manage the device information about the communicable broadcasting reception apparatus 110 with the device IDs of the respective broadcasting reception apparatus 110 being given to the device information. As a result, the remote controller 100 can recognize the types of the reception media and the receiving area receivable by the communicable broadcasting reception apparatus 110, and the presence/non-presence of the recording function based on the device IDs.

Figure 9:
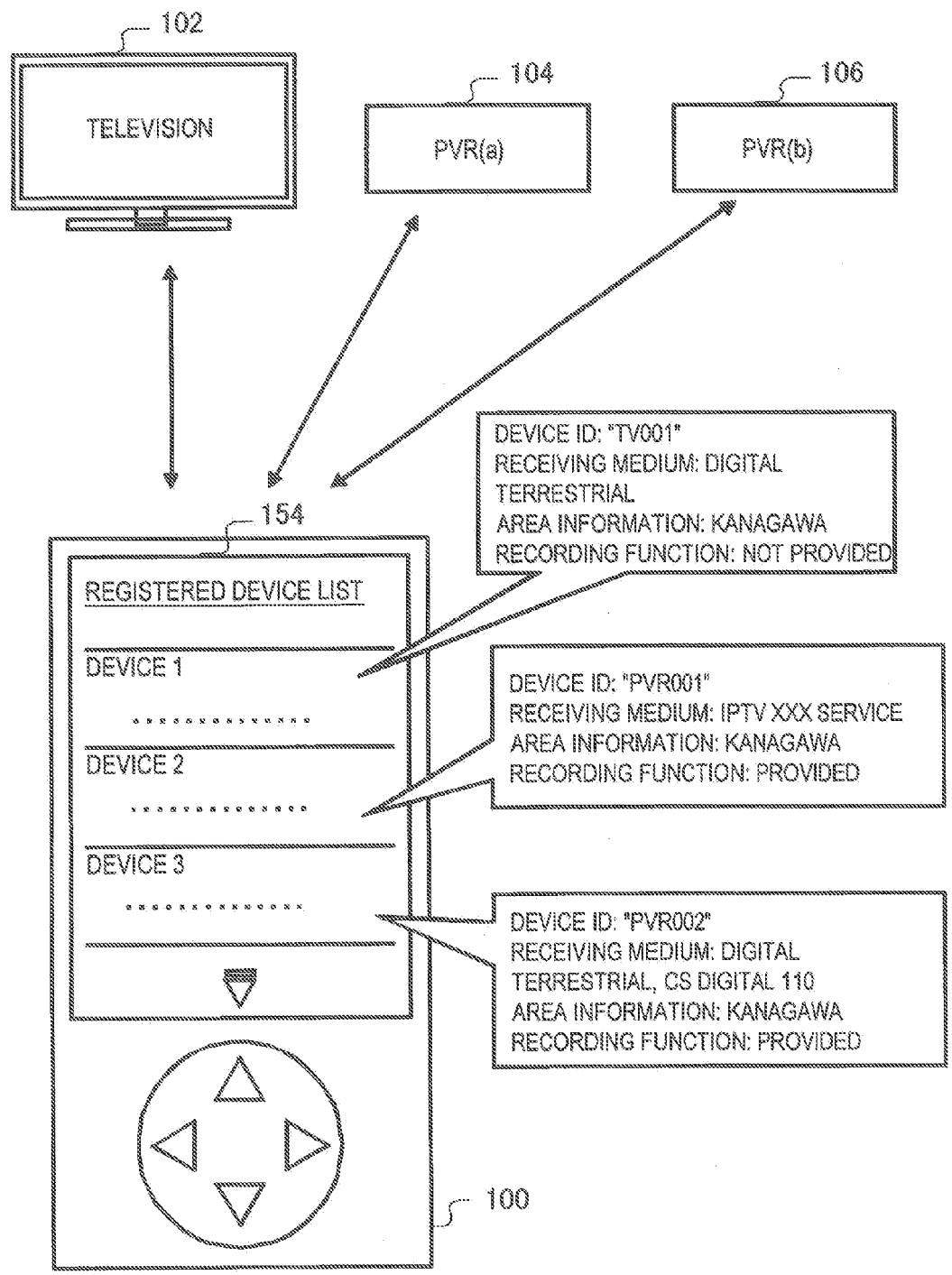
FIG. 9 is an explanatory diagram illustrating a display example of a display unit 154 for showing a list of the device information about the broadcasting reception apparatus 110 whose device IDs are registered in the embodiment.

FIG. 9 is an explanatory diagram illustrating a display example on the display unit 154 showing a list of the device information about the broadcasting reception apparatus 110 whose device IDs are registered. As shown in FIG. 9, the device information about the broadcasting reception apparatus 110 communicable with the remote controller 100 is associated with the device IDs and is displayed on the display unit 154. As a result, the remote controller 100, for example, can recognize that regarding to the broadcasting reception apparatus 110 corresponding to the device ID "TV001", the reception medium is a "digital terrestrial" medium, the receiving area is "Kanagawa" and the recording function is not provided. Similarly, the remote controller 100 can recognize specific information about all the communicable broadcasting reception apparatus 110 based on the device IDs.

The above description refers to "reception medium", "receiving area" and "recording function" as examples of the device information, but the device information is not limited to these pieces of information, and can naturally include other pieces of information specific to the devices. The sequence diagram shown in FIG. 7 is one example for describing the flow of the registering process of the broadcasting reception apparatus 110, and the registering process is not necessarily executed along the steps shown in FIG. 7. For example, the steps for transmitting the device information from the television 102, the PVR (a) 104 and the PVR (b) 106 may be executed in parallel or in a different order.

(4-2. Registration of Profile Information)

Details of the registration of the profile information about the user using the remote controller 100 are described below. The registration of the profile information is to register the information about program preference of the user using the remote controller 100, such as genre, performers and viewing time zone, as the profile information into the user management server 404 provided to the ECG service server 400. Further, personal information such as settlement method, product delivery address, telephone number and name, which is necessary for purchasing a product based on ECG information, can be set as the profile information. When the profile information is registered into the user management server 404, the user does not have to input personal information again, for example, at the time of purchasing products. For example, when a plurality of credit cards is registered, any credit card can be selected and the payment can be cleaned at the time of purchasing. Details are described later, but the ECG service server 400 can transmit only suitable ECG information to the remote controller 100 based on the profile information and the like.

Figure 10:
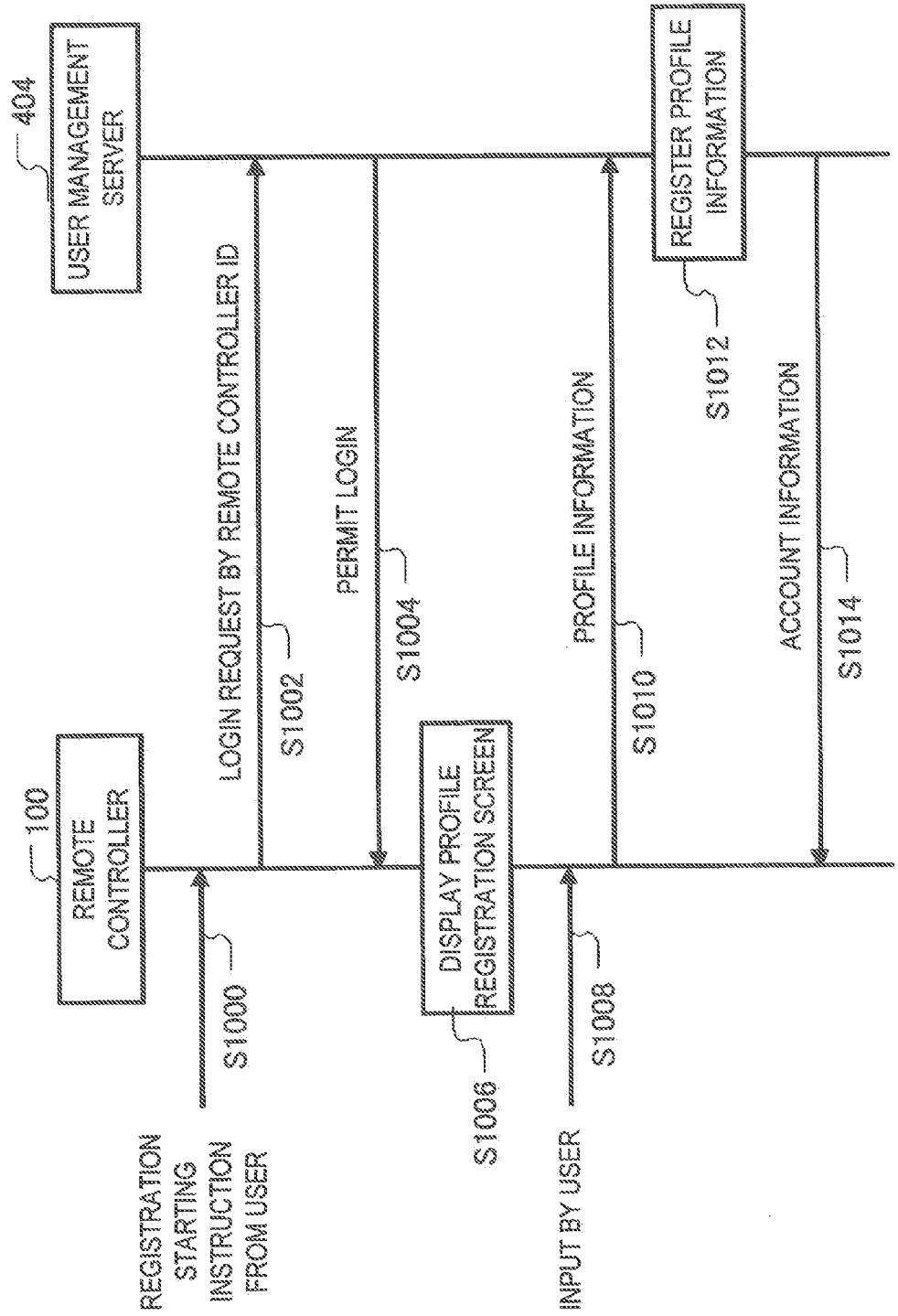
FIG. 10 is a sequence diagram illustrating one example of a process flow of the remote controller 100 and a user management server 404 for registering profile information in the embodiment.

The flow of the profile information registering process is described below with reference to FIG. 10. FIG. 10 is a sequence diagram illustrating one example of the process flow of the remote controller 100 and the user management server 404 in the profile information registering process.

As shown in FIG. 10, the profile information registering process is started by the registration starting instruction from the user at step 1000. For example, when the user starts using the remote controller 100 or desires to change profile information, the user can execute the profile information registering process. Therefore, when the user selects the initial setting button or the profile information registration starting button displayed on the display unit 154, the remote controller 100 can start the registering process.

After receiving the instruction from the user, the remote controller 100 transmits a remote controller ID including a serial number set specifically to the remote controller 100 and the like to the user management server 404 at step 1002, and requests login to the user management server 404. For example, when the profile information already registered is changed, account information given at the time of registration and the like can be simultaneously transmitted. The remote controller ID and the account information are transmitted by the ECG server communication unit 178 of the remote controller 100.

The user management server 404, which has accepted the login request including the remote controller ID from the remote controller 100, permits the login based on the remote controller ID, the account information and the like at step 1004. For example, when the remote controller 100 initially registers profile information, the user management server 404 transmits profile setting information for initial registration to the remote controller 100. On the other hand, when profile information is already registered, the user management server 404 transmits information about editing of the profile information to the remote controller 100 only when the remote controller ID and the account ID match.

Figure 11:
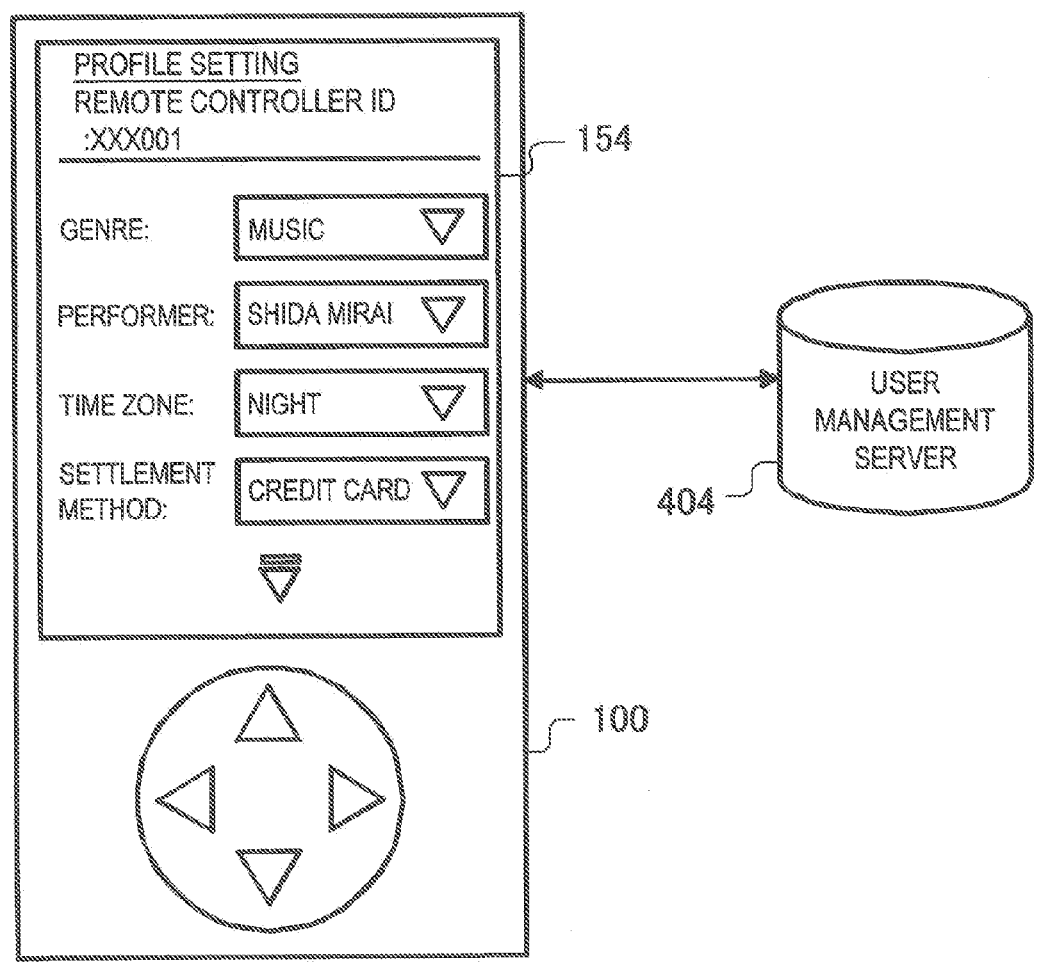
FIG. 11 is an explanatory diagram illustrating a display example of the display unit 154 for displaying a profile information registering/editing screen in the embodiment.

Thereafter, the remote controller 100 displays a profile information registration/editing screen on the display unit 154 at step 1006. FIG. 11 is an explanatory diagram illustrating a display example on the display unit 154 showing the profile information registration/editing screen.

As shown in FIG. 11, a screen for setting user's program preference is displayed on the display unit 154. On the displayed registration screen, the user can input preferable genre, performers and viewing time zone as profile information at step 1008. Further, information, such as settlement method, delivery address, telephone number and name, which is necessary for purchasing a product based on ECG information can be input as profile information. The display example shown in FIG. 11 is one example for describing the embodiment, and thus the profile information is not limited to the example shown in FIG. 11. That is to say, various information about user's contents preference and various personal information necessary for purchasing a product can be naturally registered as the profile information.

Again with reference to the sequence diagram in FIG. 10, the remote controller 100 transmits the profile information input by the user to the user management server 404 at step 1010. The user management server 404 which has received the profile information associates the profile information with the remote controller ID of the remote controller 100 so as to record it into the user information storage unit 418 of the user management server 404 at step 1012. As a result, the user management server 404 can manage profile information about each remote controller 100 (each user).

When profile information is initially registered, the user management server 404 transmits account information corresponding to the remote controller 100 to the remote controller 100 at step 1014. As a result, the user using the remote controller 100 logs into the user management server 404 again based on the account information, so as to be capable of editing the already registered profile information. Also, by using the account information, the user can log into, for example, a Web page set up by the ECG service provider 306 so as to be capable of editing the profile information or the like.

(4-3. Acquisition of EPG SI and ECG Information)

A series of processes for receiving EPG SI from the television 102 and displaying program information on the program display unit 170, and receiving ECG information related to the program from the ECG service server 400 so as to display the ECG information on the related information display unit 172 by the remote controller 100 is described below.

The following description refers to a case where only the television 102 is used as the broadcasting reception apparatus 100 to be connected to the remote controller 100 as an example for convenience of the description. However, EPG SI can be, for example, acquired for the plurality of broadcasting reception apparatus 110 by the similar process.

(Process for Acquiring EPG SI and ECG Information about Currently Broadcasting Programs)

A process for acquiring EPG SI about currently broadcasting programs from the television 102 and displaying program information and ECG information about the program on the display unit 154 based on the EPG SI by the remote controller 100 is described below.

Figure 12:
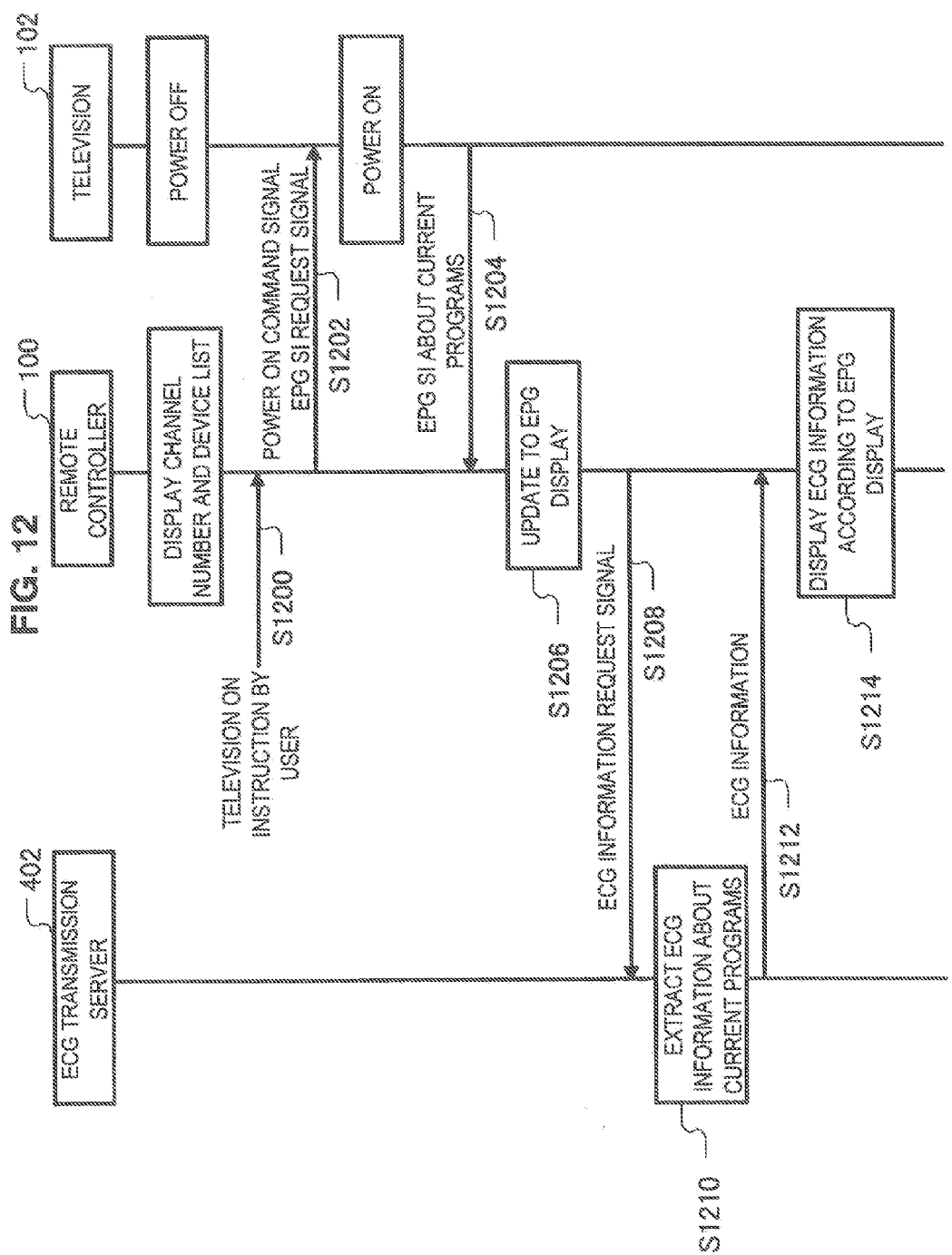
FIG. 12 is a sequence diagram illustrating one example of a process flow of the remote controller 100, an ECG transmission server 402 and the television 102 for displaying a currently broadcasting program and ECG information about the program in the embodiment.

FIG. 12 is a sequence diagram illustrating a process flow of the remote controller 100, the ECG transmission server 402 and the television 102 for displaying broadcasting programs receivable by the television 102 and ECG information about the programs by the remote controller 100.

Figure 13:
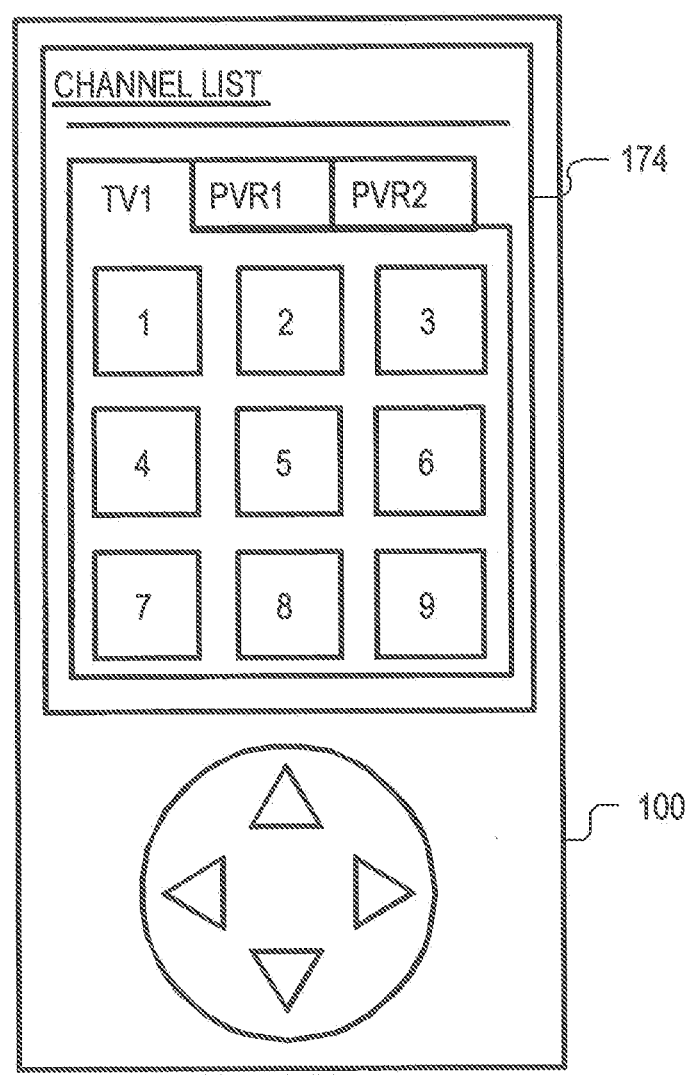
FIG. 13 is an explanatory diagram illustrating a display example of channel numbers of the display unit 154 in the embodiment.

As shown in FIG. 12, when the power of the television 102 is OFF (standby state), the remote controller 100 can display, for example, a list of channel numbers and the broadcasting reception apparatus 110 on the channel number display unit 174 included in the display unit 154. FIG. 13 is an explanatory diagram illustrating a display example on the channel number display unit 174 displaying the list of the channel numbers and the broadcasting reception apparatus 110. As shown in FIG. 13, the channel numbers corresponding to the content provider 302 receivable by the television 102 are displayed on the channel number display unit 174. The remote controller 100 can recognize the reception medium, the receiving area and the like of the broadcasting reception apparatus 110 due to the device information registering process shown in FIG. 7. Therefore, the remote controller 100 can display the channel numbers corresponding to the respective broadcasting reception apparatus 110 based on the registered device information.

The display of the channel number display unit 174 shown in FIG. 13 is one example for describing the embodiment, and thus the channel numbers or the like can be displayed in a format different from FIG. 13. The channel numbers are not necessarily displayed at the time when the power of the television 102 is OFF. Of course, for example, channel numbers or the like may not displayed by an electric power saving mode, or program information and related information acquired by the following processes are displayed. For example, the user can appropriately change the setting such that what information may be displayed on the display unit 154 at the time when the power of the television 102 is OFF.

Again with reference to FIG. 12, when the remote controller 100 receives an instruction for turning-on of the power of the television 102 from the user at step 1200, the remote controller 100 transmits a command signal for turning on the power to the television 102 at step 1202. At this time, the remote controller 100 transmits also a request signal of EPG SI about a broadcasting program receivable by the television 102 to the television 102. As described above, the remote controller 100 can accept the instruction from the user at the command control unit 182, and can transmit the command signal for turning on the power to the television 102 via the device communication unit 176. As described above, the EPG acquisition control unit 162 of the remote controller 100 can transmit the request signal of EPG SI to the television 102 via the device communication unit 176.

The television 102 turns on the power according to the request signal for turning on the power from the remote controller 100. Thereafter, the television 102 transmits EPG SI about the broadcasting program receivable by the television 102 from the content provider 302 to the remote controller 100 at step 1204. At this time, the television 102 can acquire the latest EPG SI from the content provider 302 and can transmit it to the remote controller 100. When EPG SI about the broadcasting program is already acquired from the content provider 302, the EPG SI may be transmitted to the remote controller 100.

Figure 14:
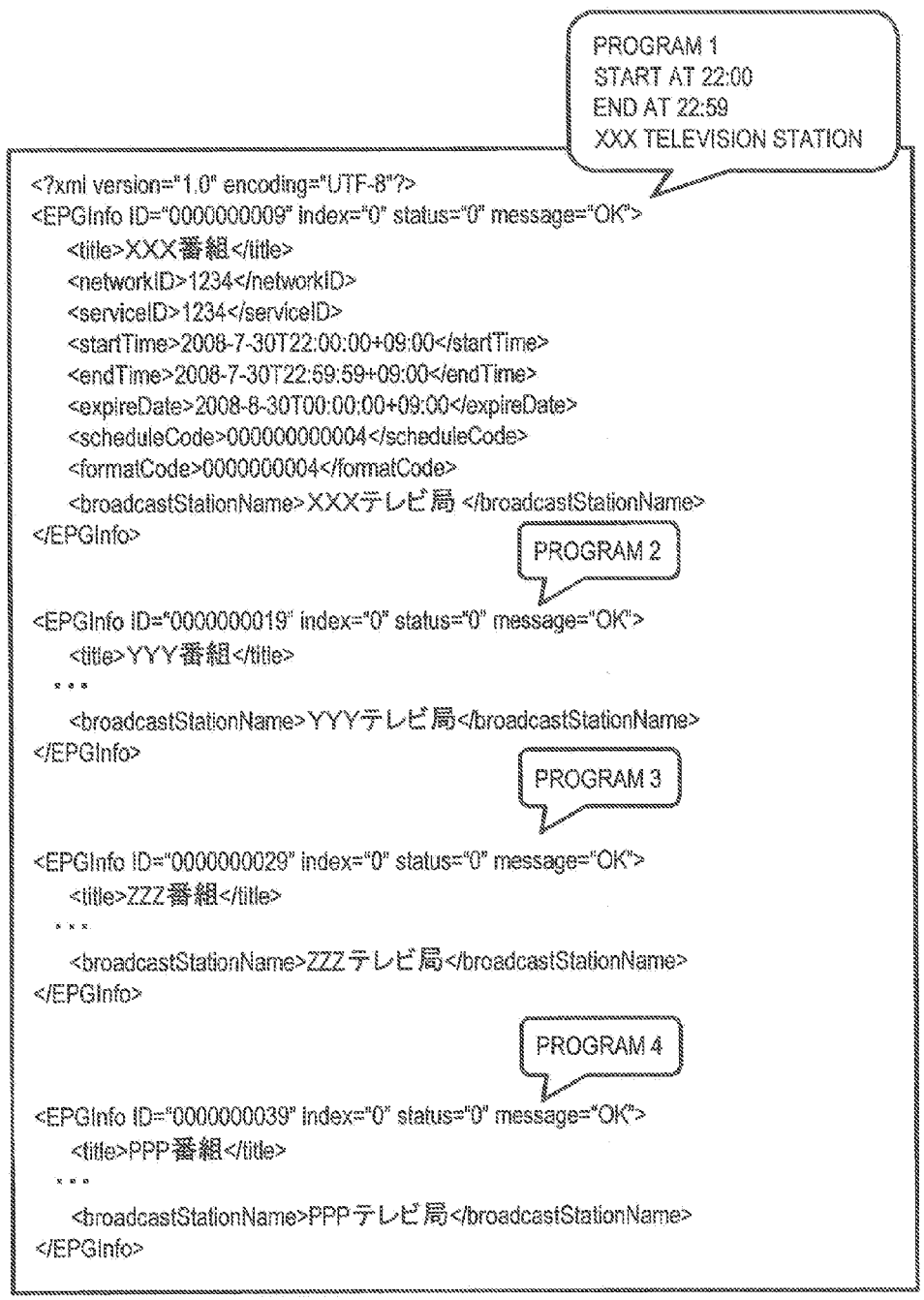
FIG. 14 is an explanatory diagram illustrating metadata description example of EPG SI transmitted from the television 102 to the remote controller 100 in the embodiment.

Metadata description example of the EPG SI to be transmitted from the television 102 to the remote controller 100 is described with reference to FIG. 14. FIG. 14 is an explanatory diagram illustrating the metadata description example of EPG SI to be transmitted from the television 102.

As shown in FIG. 14, information about a currently broadcasting program, such as program name, broadcasting date, starting time, end time and broadcasting station, is described in EPG SI to be transmitted from the television 102. In the example shown in FIG. 14, as information about a program 1, title "XXX program", broadcasting date "2008/07/30", starting time "22:00", end time "22:59", broadcasting station "XXX television station", and the like are described. Similarly, information for the other programs receivable by the television 102 are described in EPG SI as, program 2, program 3, program 4 . . . . The remote controller 100 receives such EPG SI from the television 102 so as to be capable of recognizing information about the programs currently receivable by the television 102.

Again with reference to FIG. 12, the remote controller 100 which has received the EPG SI from the television 102 displays information about the currently broadcasting programs on the program display unit 170 included in the display unit 154 at step 1206. The remote controller 100 can extract the information about the currently broadcasting programs based on the EPG SI shown in FIG. 14 so as to be capable of sequentially displaying the information on the program display unit 170.

Figure 15:
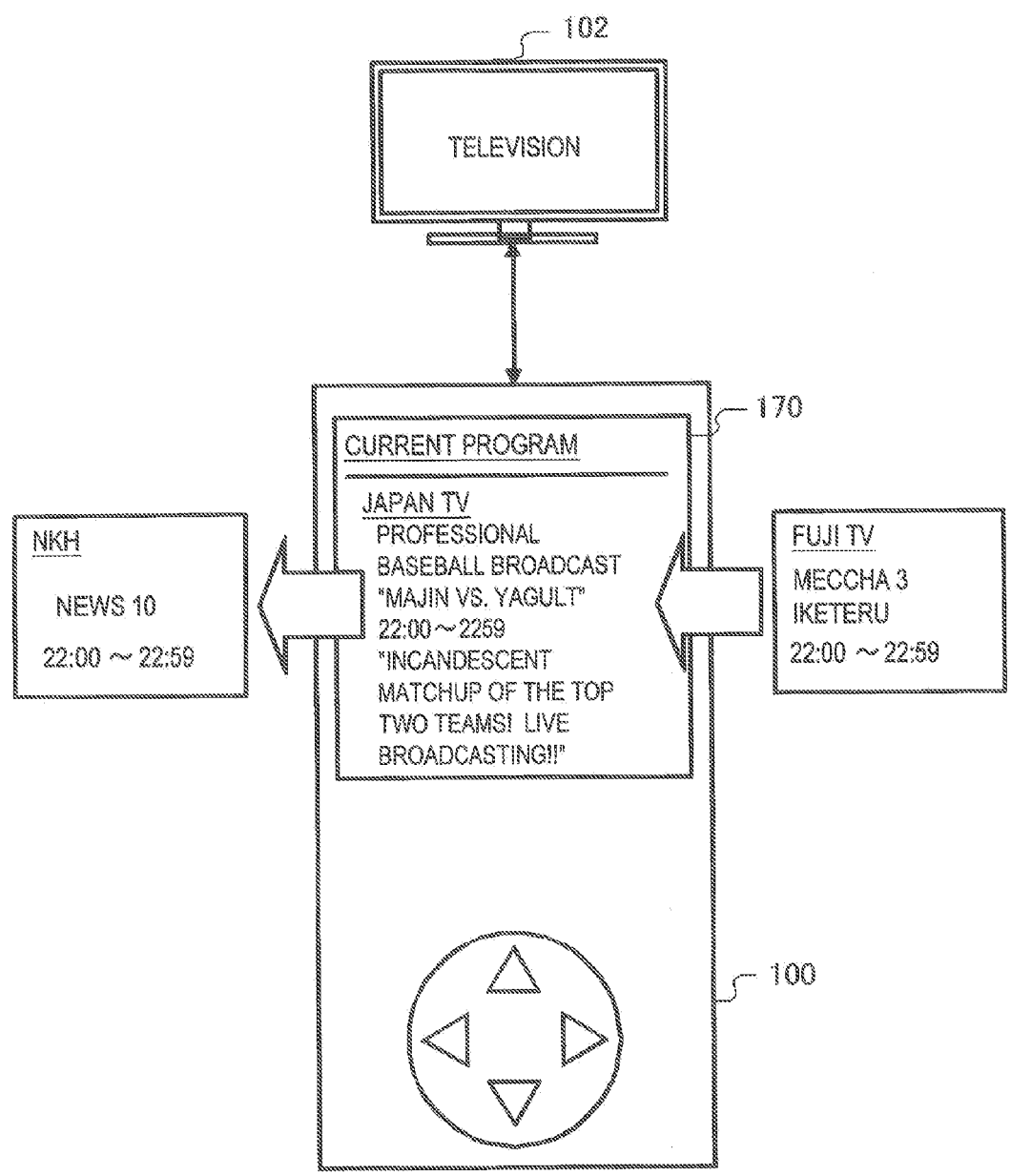
FIG. 15 is an explanatory diagram illustrating a display example of a program display unit 170 for sequentially displaying currently broadcasting programs in the embodiment.

One example of the program information displayed on the program display unit 170 is described with reference to FIG. 15. FIG. 15 is an explanatory diagram illustrating a display example on the program display unit 170 showing information about a currently broadcasting program.

As shown in FIG. 15, the remote controller 100 can switch the display from the channel list shown in FIG. 13 to the currently broadcasting program. The display unit 154 of the remote controller 100 can appropriately display the program display unit 170 or the related information display unit 172 individually, or simultaneously display these display units. In the example shown in FIG. 15, information about a plurality of broadcasting programs receivable by the television 102 is switched to be displayed on the program display unit 170 every predetermined time. As a result, the user selects the program displayed on the program display unit 170 so as to be capable of instructing the television 120 to switch the channel into this program, for example. The example shown in FIG. 15 is one example of the display on the program display unit 170, and thus, for example, the number of programs displayed on the program display unit 170 and the time at which program information is switched can be arbitrarily changed. The display on the program display unit 170 is, for example, set and changed by the EPG display control unit 164 as described above.

Again with reference to the sequence diagram of FIG. 12, in order to acquire ECG information about the program currently displayed on the program display unit 170, the remote controller 100 transmit the request signal of the ECG information to the ECG service server 400 at step 1208. As shown in FIG. 14, not only information about the program contents but also information for specifying the program, such as network ID, service ID, schedule code and expiration date, is described in the EPG SI received from the television 102. The remote controller 100 transmits such various information to the ECG transmission server 402 of the ECG service server 400 so as to be capable of acquiring the ECG information about the program. The remote controller 100 can transmit the request signal of the ECG information to the ECG service server 400 via the ECG server communication unit 178 by means of the ECG acquisition control unit 166.

The ECG transmission server 402, which has received the request signal of ECG information from the remote controller 100, extracts the ECG information about the programs (currently broadcasting programs) requested by the remote controller 100 from the ECG storage unit 412 at step 1210. Various ECG information associated with various contents distributed from the content provider 302 is recorded in the ECG storage unit 412 as described above. Therefore, the ECG extraction unit 410 of the ECG transmission server 402 can easily extract the ECG information about the programs based on the information such as network ID, service ID and starting time transmitted from the remote controller 100.

The ECG information extracted from the ECG storage unit 412 is transmitted to the remote controller 100 by the ECG transmission unit 414 of the ECG transmission server 402 at step 1212.

Figure 16:
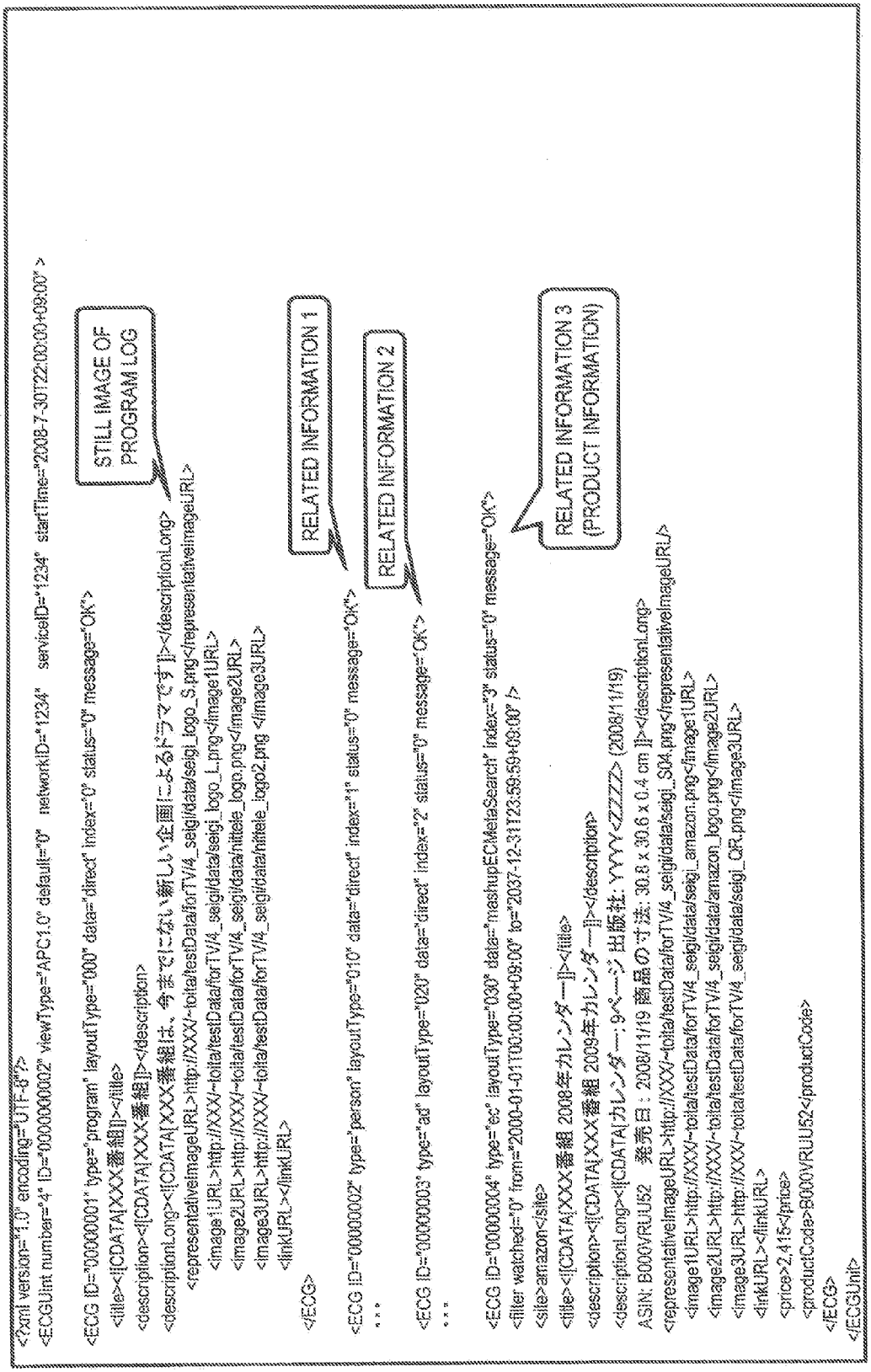
FIG. 16 is an explanatory diagram illustrating a metadata description example of ECG information transmitted from the ECG transmission server 402 in the embodiment.

Metadata description example of ECG information transmitted from the ECG transmission server 402 is described with reference to FIG. 16. FIG. 16 is an explanatory diagram illustrating metadata description example of ECG information transmitted from the ECG transmission server 402.

As shown in FIG. 16, information about currently broadcasting programs transmitted from the remote controller 100, such as details of program contents, still images of program logo and product information relating to performers is described in the ECG information transmitted from the ECG transmission server 402. It can be seen that information about contents details of "XXX program" and still images of program logo, sale information about program calendar, and the like are described in the metadata of ECG information shown in FIG. 16. The remote controller 100 receives such ECG information from the ECG transmission server 402, so as to be capable of recognizing related information relating to broadcasting programs currently displayed on the program display unit 170.

Again with reference to the sequence diagram of FIG. 12, the remote controller 100 displays related information relating to broadcasting programs, which is currently displayed on the program display unit 170, on the related information display unit 172 of the display unit 154 based on ECG information transmitted from the ECG transmission server 402 at step 1214.

Figure 17:
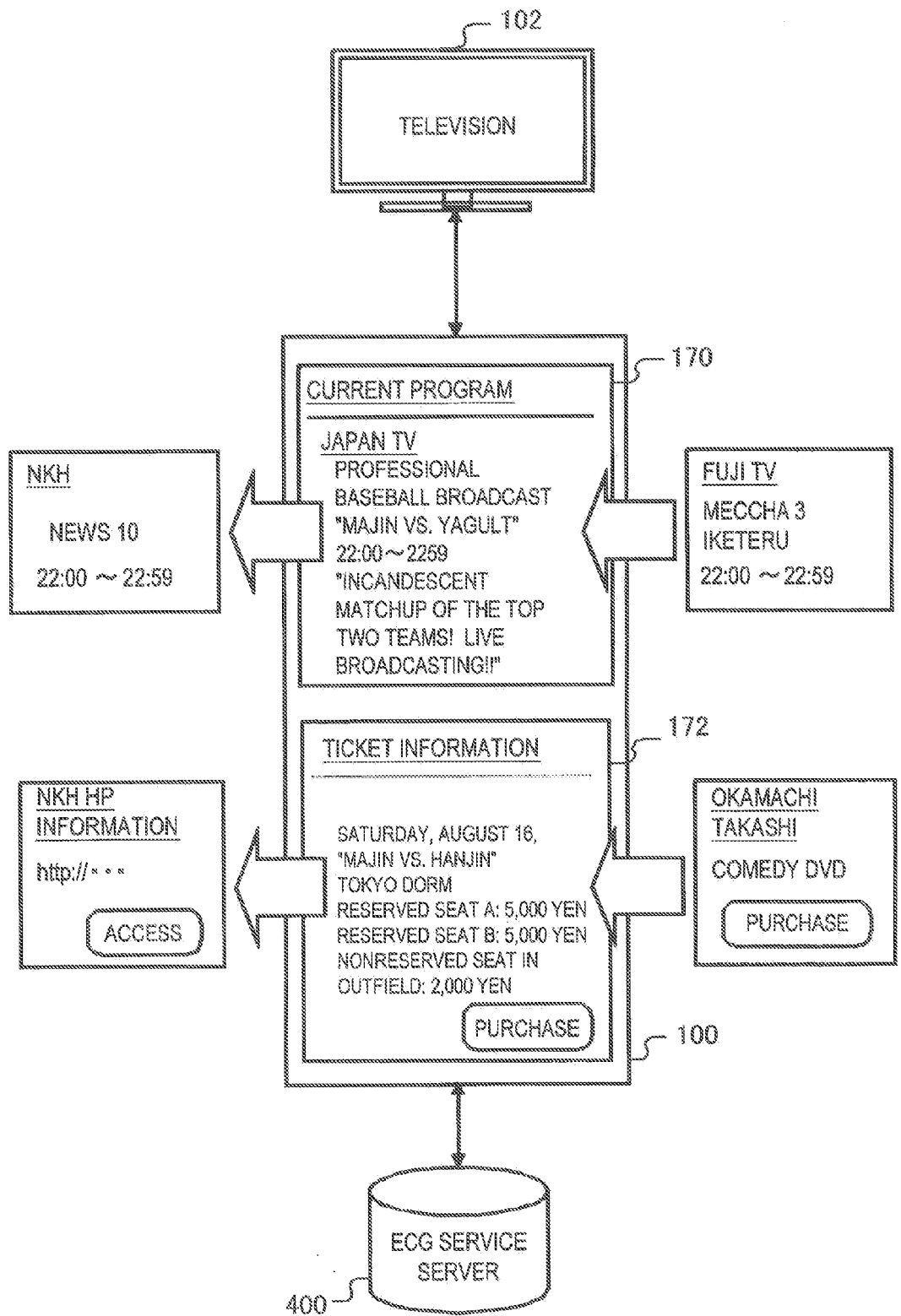
FIG. 17 is an explanatory diagram illustrating a display example of a related information display unit 172 for displaying related information relating to the currently broadcasting programs in the embodiment.

One example of the related information displayed on the related information display unit 172 is described with reference to FIG. 17. FIG. 17 is an explanatory diagram illustrating a display example of the related information display unit 172 displaying the related information relating to the currently broadcasting programs.

As shown in FIG. 17, the remote controller 100 can display the related information display unit 172 as well as the program display unit 170. The remote controller 100 can display the related information relating to the programs on the related information display unit 172 according to the program information displayed on the program display unit 170. In the example shown in FIG. 17, currently (22:00 to 22:59) broadcasting programs are sequentially displayed on the program display unit 170 every predetermined time. Accordingly, the related information relating to the programs displayed on the program display unit 170 is sequentially displayed on the related information display unit 172. As a result, the user can view the related information displayed on the related information display unit 172 and also can utilize various services using the related information such as purchasing of products and access to a Web page, for example.

Figure 18:
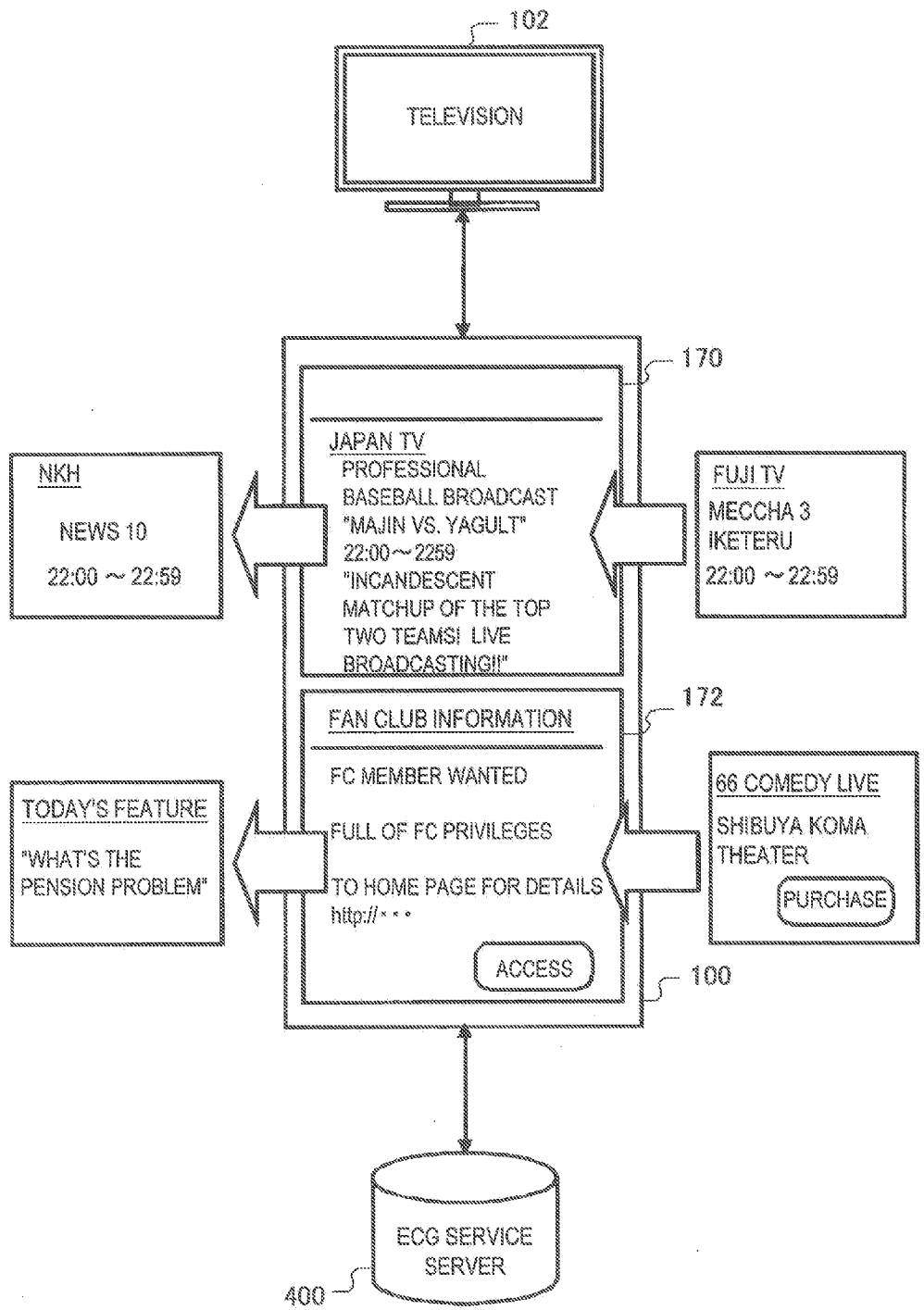
FIG. 18 is an explanatory diagram illustrating a display example of a program guide and related information by means of the remote controller 100 in the embodiment.

As described in the description example of the ECG information, one program has plural pieces of related information. Therefore, for example, when all programs to be displayed on the program display unit 170 are displayed once, as shown in FIG. 18, the remote controller 100 can display related information different from the previous one on the related information display unit 172 at the time of displaying the same program on the program display unit 170 at next time. It can be seen in the example shown in FIG. 18 that the same program information as the example shown in FIG. 17 is sequentially displayed on the program display unit 170, but related information different from the example shown in FIG. 17 is sequentially displayed on the related information display unit 172. The remote controller 100 can provide not only current broadcasting programs but also various related information relating to the programs to the user.

Figure 19:
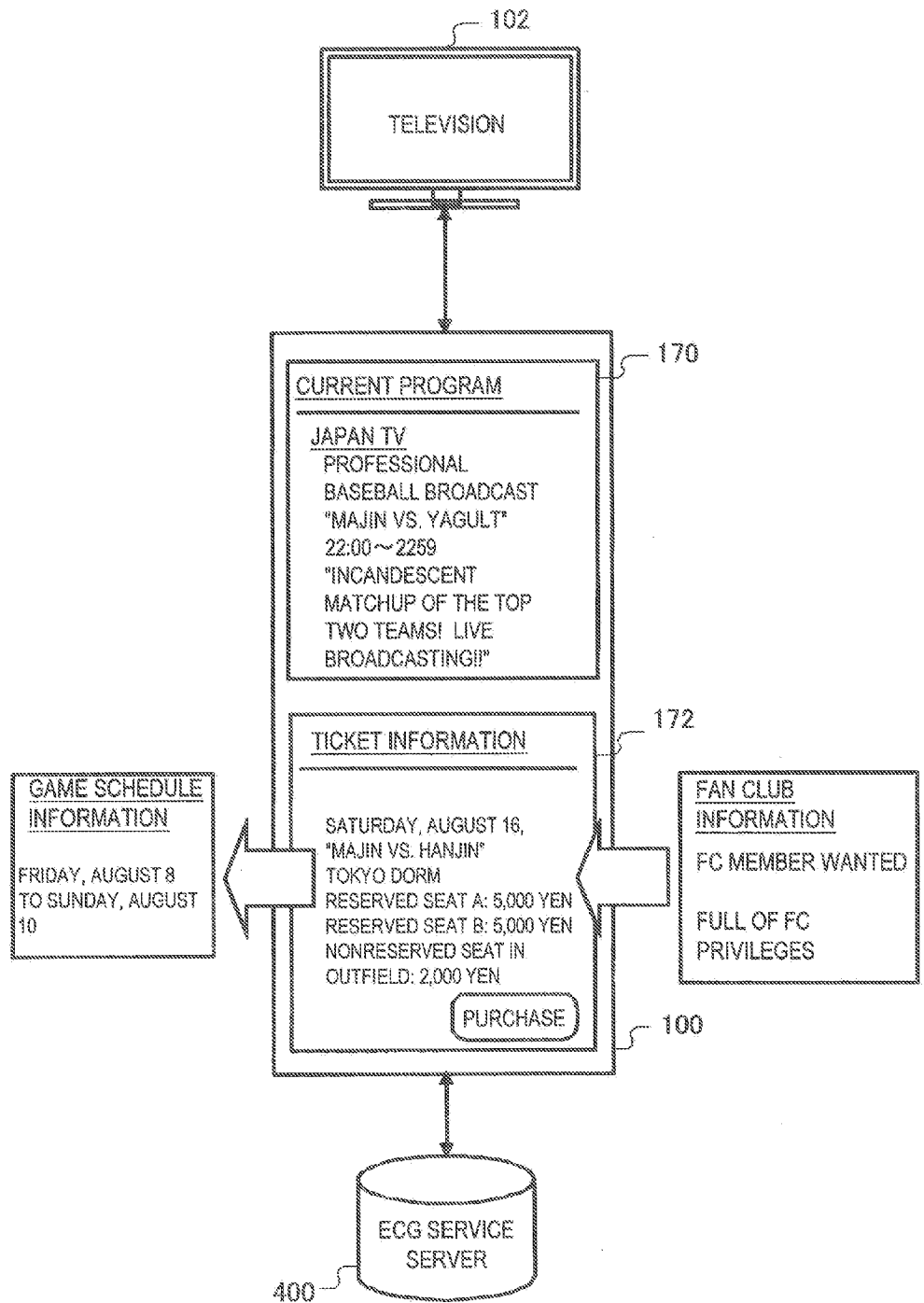
FIG. 19 is an explanatory diagram illustrating another display example of a program guide and related information by means of the remote controller 100 in the embodiment.

For example, when the user selects a predetermined program, the remote controller 100 can display information about the program on the program display unit 170 longer than usual as shown in FIG. 19 so as to be capable of sequentially displaying the related information relating to the program on the related information display unit 172. FIG. 19 illustrates an example in the case where the user selects "Professional Baseball Broadcast" of "Japan TV" from the programs displayed on the program display unit 170. As shown in FIG. 19, the program information selected by the user is displayed on the program display unit 170 for a while. Further, while the program information is displayed on the program display unit 170, related information relating to the program is sequentially displayed on the related information display unit 172. It can be seen from FIG. 19 that since the user selects the professional baseball broadcast, various related information relating to the professional baseball broadcast, such as ticket information, game schedule information and fan club information, is displayed on the related information display unit 172.

Figure 20:
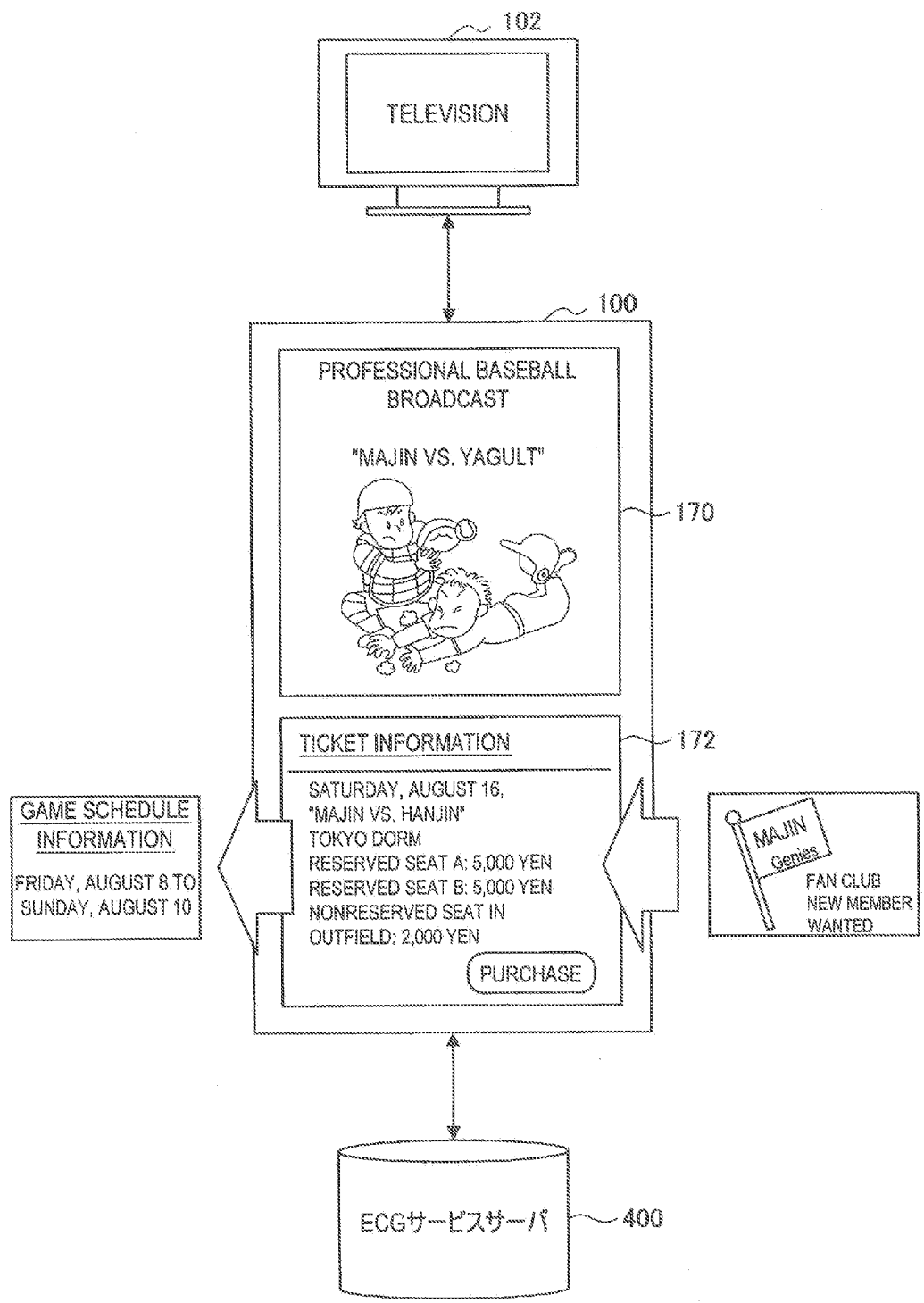
FIG. 20 is an explanatory diagram illustrating another display example of a program guide and related information by means of the remote controller 100 in the embodiment.

As shown in FIG. 20, the remote controller 100, for example, can display an image based on image information included in the ECG information together with the program information or the related information. In the example shown in FIG. 20, the remote controller 100 displays an image included in the ECG information acquired from the ECG service server 400 together with the program information displayed on the program display unit 170. Further, similarly, as to the related information displayed on the related information display unit 172, both an image and text information can be displayed.

The display unit 154 of the remote controller 100 can sequentially display broadcasting programs currently receivable by the television 102 and related information relating to the programs appropriately on the program display unit 170, the related information display unit 172, and the like. FIGS. 17 to 20 illustrate the examples of the display on the program display unit 170 and the related information display unit 172. For example, the number of information displayed on the program display unit 170 and the related information display unit 172, the time at which program information is switched, the arrangements of the respective display units, and the like can be set and changed arbitrarily. The various setting, change, and the like of the display are performed by the EPG display control unit 164 and the EC display control unit 168 as described above. Therefore, the user can arbitrarily set the display method, the display time, and the like of various information.

The remote controller 100 can display not only program information about broadcasting programs receivable by the television 120 but also various related information relating to the program according to the above-described processes. As a result, the user can easily perform the operations such as viewing and selection of program contents and viewing of related information.

(Process for Acquiring EPG SI and ECG Information about Programs to be Broadcasted Next)

Figure 21:
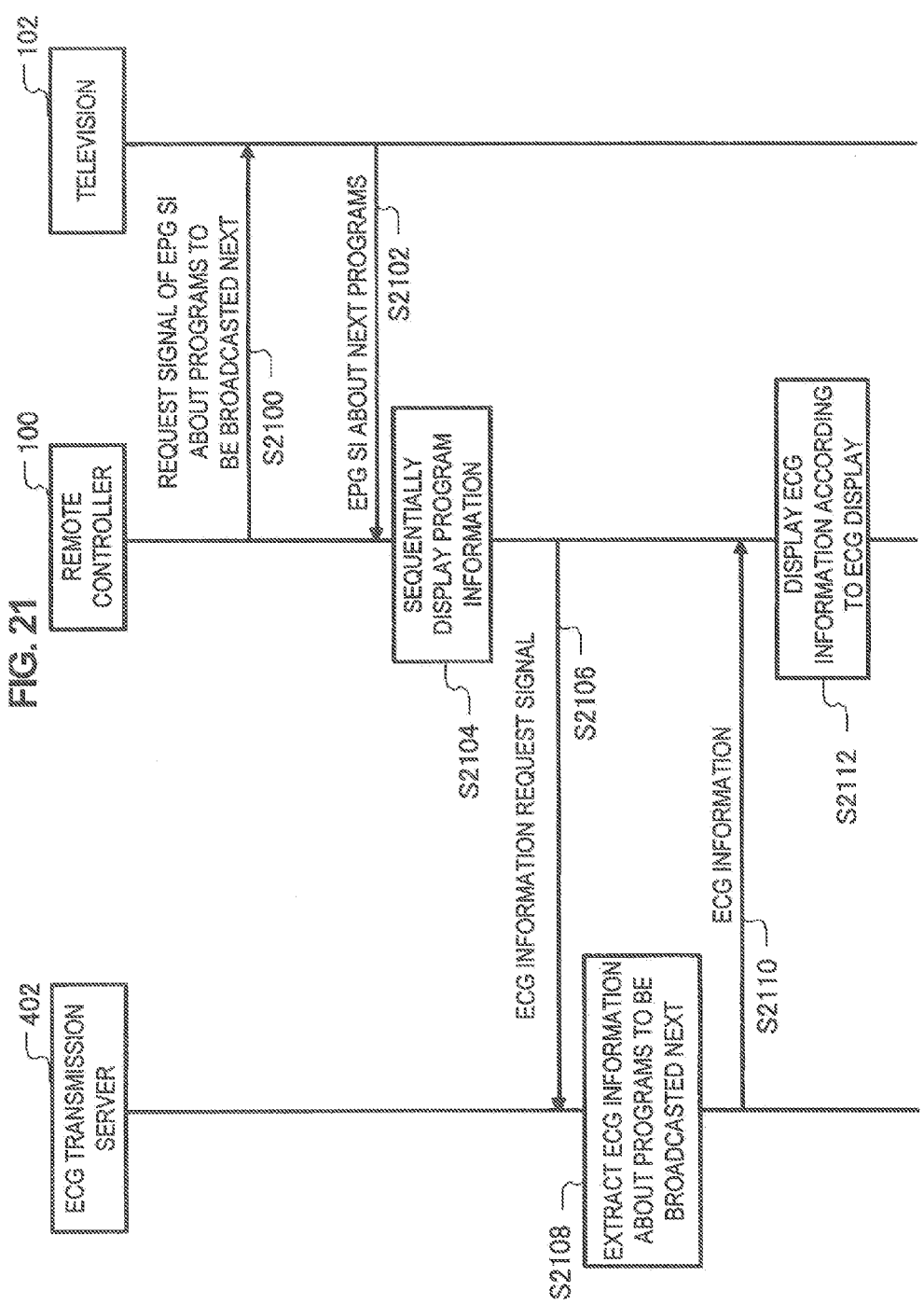
FIG. 21 is a sequence diagram illustrating one example of a process flow of the remote controller 100, the ECG transmission server 402 and the television 102 for displaying a program to be broadcasted next and ECG information about the program in the embodiment.

After various information about currently broadcasting programs is displayed according to the processing sequence shown in FIG. 12, the remote controller 100 can acquire EPG SI about programs to be broadcasted next receivable by the television 102 and display the EPG SI according to the processing sequence shown in FIG. 21. The remote controller 100 acquires EPG SI about programs to be broadcasted next from the television 102 and displays program information and ECG information about the programs on the display unit 154 based on the EPG SI. This process is described below with reference to FIG. 21.

As shown in FIG. 21, the remote controller 100 transmits a request signal for requesting EPG SI about the programs to be broadcasted next receivable by the television 102 to the television 102 at step 2100. For example, after the remote controller 100 acquires various information about the currently broadcasting programs, it can execute the process at step 2100.

The television 102 transmits EPG SI about the programs to be broadcasted next to the remote controller 100 according to the request signal form the remote controller 100 at step 2102. At this time, the television 102 acquires the latest EPG SI from the content provider 302 so as to transmit it to the remote controller 100. When the television 102 already acquires EPG SI about the programs to be broadcasted next from the content provider 302, it may transmit the EPG SI to the remote controller 100.

The remote controller 100 which has received EPG SI from the television 102 displays programs to be broadcasted next on the program display unit 170 at step 2104. The remote controller 100 can extract information about the programs to be broadcasted next based on EPG SI shown in FIG. 14, and sequentially display the information on the program display unit 170. The program information about the currently broadcasting programs is already displayed on the program display unit 170. Therefore, the remote controller 100 can sequentially display the information about the currently broadcasting programs and the programs to be broadcasted next on the program display unit 170. As a result, for example, when the user selects a currently broadcasting program, the remote controller 100 can instruct the television 102 to switch a channel into the program. Also, for example, when the user selects a program to be broadcasted next, the remote controller 100 can set timer recording of the program.

Similarly to steps 1208 to 1214 shown in FIG. 12, the remote controller 100 acquires ECG information about the programs to be broadcasted next from the ECG service server 400 so as to display it on the related information display unit 172 at steps 2106 to 2112.

The remote controller 100 can display not only various information about currently broadcasting programs on the television 102 but also information about programs to be broadcasted next and various related information relating to the programs according to the above-described processes. As a result, the user can recognize the programs to be broadcasted next by viewing the remote controller 100. Further, when the broadcasting reception apparatus 110 which can receive the programs to be broadcasted next has the recording function, for example, the timer recording of the programs can be set.

(Process for Acquiring EPG SI and ECG Information about Programs to be Broadcast Today)

Figure 22:
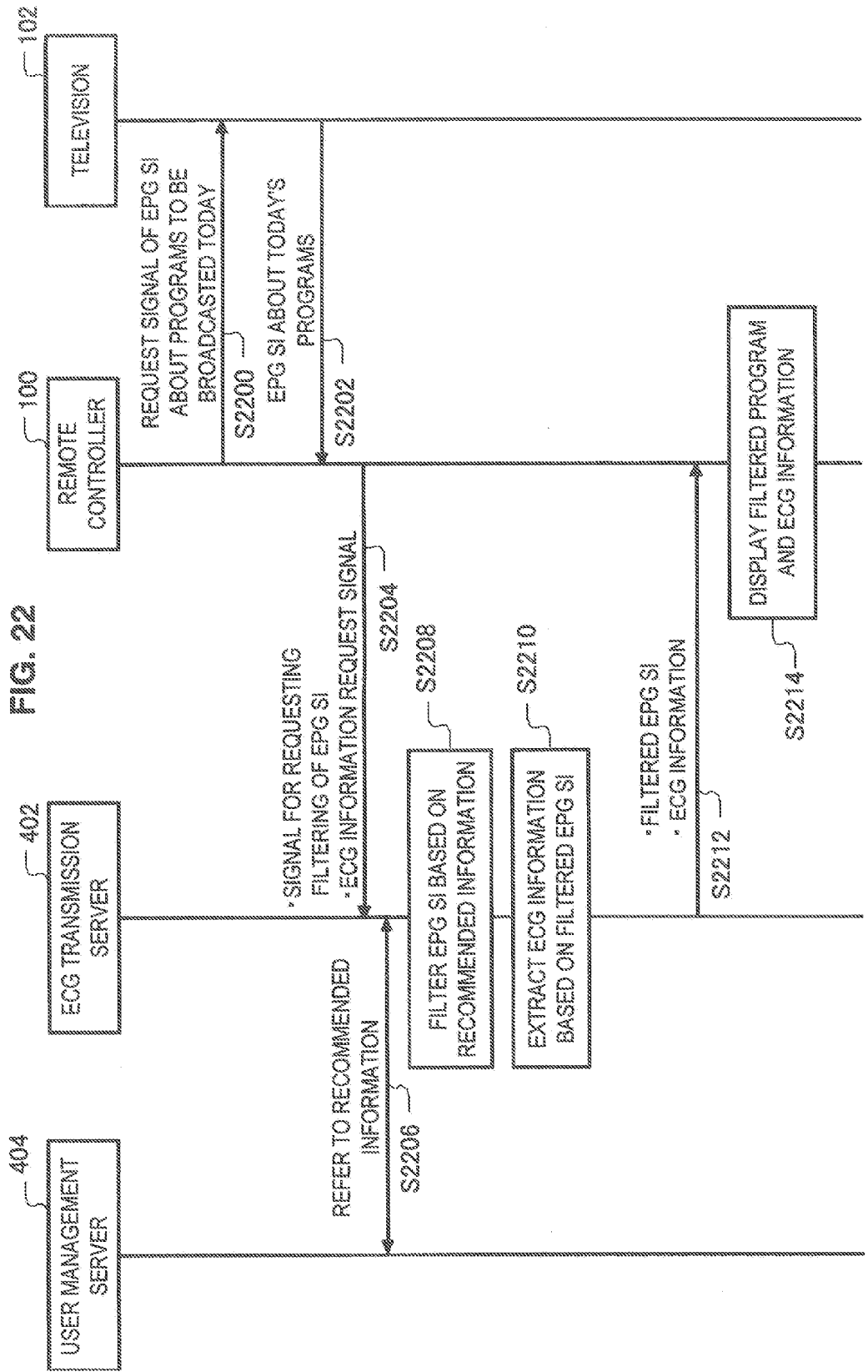
FIG. 22 is a sequence diagram illustrating one example of a process flow of the remote controller 100, the ECG transmission server 402 and the television 102 for displaying programs to be broadcasted today and ECG information about the programs in the embodiment.

After various information about the programs to be broadcasted next is displayed according to the processing sequence shown in FIG. 21, the remote controller 100 can acquire various information about programs to be broadcasted today and display the various information on the television 102 according to a processing sequence shown in FIG. 22. One example of a process for displaying various information about the programs to be broadcasted today in the remote controller 100, the ECG transmission server 402 and the television 102 is described below with reference to FIG. 22.

As shown in FIG. 22, the remote controller 100 transmits a request signal for requesting EPG SI about the programs to be broadcasted today to the television 102 at step 2200. For example, after the remote controller 100 acquires various information about the programs to be broadcasted next, it can execute the process at step 2200.

The television 102 transmits EPG SI about the programs to be broadcasted today to the remote controller 100 according to the request signal from the remote controller 100 at step 2200. At this time, the television 102 acquires the latest EPG SI from the content provider 302 so as to transmit it to the remote controller 100. When the television 102 already acquires EPG SI about the programs to be broadcasted today from the content provider 302, it may transmit the EPG SI to the remote controller 100.

The remote controller 100 receives EPG SI about all the programs to be broadcasted today at step 2202. Since these programs include information about genre which does not interest the use, programs with user's dislikable performers, programs broadcasted in non-viewing time zone, and the like, the display of all information on the program display unit 170 is not unfavorable for the user. In order to solve this issue, the remote controller 100 transmits EPG SI to the ECG transmission server 402 and requests the extraction of only EPG SI suitable for the user. As described above, the user management server 404 of the ECG service server 400 manages recommended information for each remote controller 100 (each user) based on profile information registered by each user, preference information created by each viewing history, and the like. Therefore, the ECG transmission server 402 can extract only predetermined EPG SI which matches with contents preference of the user using the remote controller 100 from the plurality of EPG SIs transmitted from the remote controllers 100 based on the recommended information in the user management server 404.

In the sequence shown in FIG. 22, the remote controller 100 transmits all the EPG SIs received from the television 102 and request signal of ECG information to the ECG transmission server 402 at step 2204. In response to this, the ECG transmission server 402 refers to the recommended information corresponding to the remote controller 100 which has transmitted the request signal in plural pieces of recommended information managed by the user management server 404 at step 2206. At this time, the ECG transmission server 402, for example, compares the serial number of the remote controller 100 which has transmitted the request signal with the remote controller ID associated with the recommended information, so as to easily refer to the recommended information corresponding to the remote controller 100.

Thereafter, the ECG transmission server 402 filters a predetermined number of EPG SIs from all the EPG SIs transmitted from the remote controller 100 based on the recommended information at step 2208. Since the recommended information is created from the profile information set by the user, the preference information based on an actual viewing history, and the like as described above, the ECG transmission server 402 can extract only EPG SI about the program matching with the user's preference. The EPG SI is filtered by the ECG control unit 408 of the ECG transmission server 402.

Thereafter, the ECG transmission server 402 extracts ECG information about the program of the filtered EPG SI from the ECG storage unit 412 at step 2210.

The ECG transmission server 402 transmits the extracted EPG SI and ECG information to the remote controller 100 at step 2212.

In response to this, the remote controller 100 sequentially displays program information on the program display unit 170 based on the EPG SI received from the ECG transmission server 402. Since the program information displayed in such a manner is only program information filtered by the ECG transmission server 402, in the programs to be broadcasted today, only the programs, which match with the user's preference, are displayed on the program display unit 170. Also regarding to the related information displayed on the related information display unit 172, only ECG information about programs with EPG SI being filtered is displayed, and thus the related information relating to programs which does not match with the user's preference is not displayed. That is to say, the remote controller 100 can provide only various information about programs which match with the user's preference to the user in many programs to be broadcasted today. Since the currently broadcasting programs and the programs to be broadcasted next are already displayed on the program display unit 170, additionally filtered programs to be broadcasted today are sequentially displayed on the program display unit 170. As a result, the user views the remote controller 100 so as to be capable of recognizing only the information about programs to be broadcasted today which matches with the user's preference. When the broadcasting reception apparatus 110, which can receive the programs to be broadcasted today, has the recording function, the timer recording of the programs can be set, for example.

The user can arbitrarily set and change the number of EPG SIs filtered by the ECG transmission server 402, and the display method of currently broadcasting programs, programs to be broadcasted next, filtered programs to be broadcasted today, and the like.

(Process for Acquiring EPG SI and ECG Information about Programs to be Broadcasted During a Week)

Figure 23:
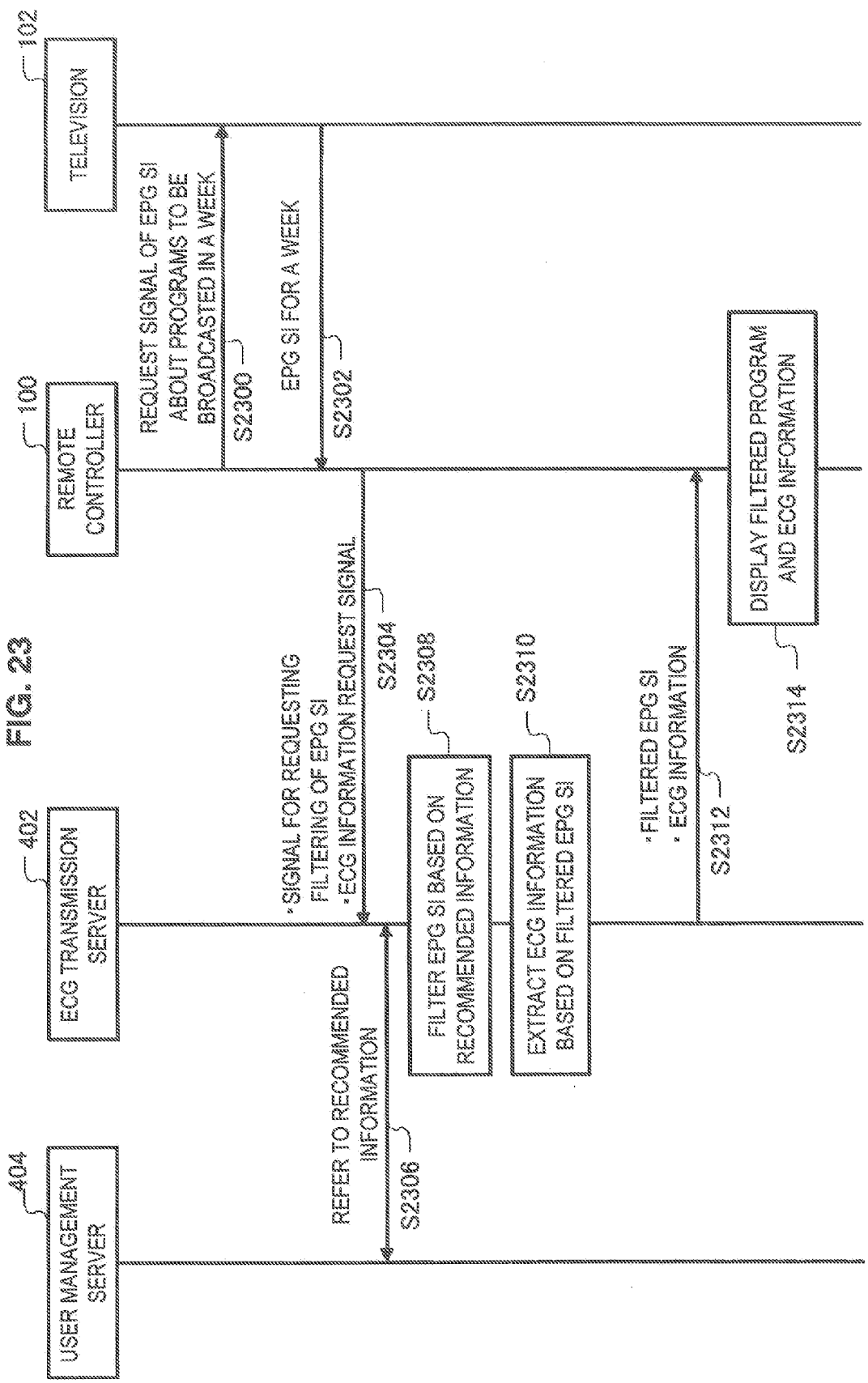
FIG. 23 is a sequence diagram illustrating one example of a process flow of the remote controller 100, the ECG transmission server 402 and the television 102 for displaying programs to be broadcasted during a week and ECG information about the programs in the embodiment.

After the various information about the programs to be broadcasted next is displayed according to the processing sequence shown in FIG. 22, the remote controller 100 can acquire various information about programs to be broadcasted during a week and display the information on the television 102 according to a processing sequence shown in FIG. 23. Since the processing sequence shown in FIG. 23 is similar to the processing sequence shown in FIG. 22, details are not described. Similarly, in this sequence, the remote controller 100 can display only information which matches with the user's preference according to the filtering process.

Therefore, the remote controller 100 can provide only various information about programs matching with the user's preference in many programs to be broadcasted during a week to the user. Since the currently broadcasting programs, the programs to be broadcasted next and the filtered programs to be broadcasted today are already displayed on the program display unit 170, additionally the filtered programs to be broadcasted during a week are sequentially displayed on the program display unit 170. As a result, the user views the remote controller 100 so as to be capable of recognizing only the information about the programs matching with the user's preference in the programs to be broadcasted during a week. When the broadcasting reception apparatus 110 which can receive the programs to be broadcasted during a week has the recording function, the timer recording of the programs can be set, for example.

According to the processing sequence in the remote controller 100, the television 102 and the ECG service server 400, the remote controller 100 can display information about contents received from the broadcasting reception apparatus 110 and various related information relating to the contents received from the information providing server. As a result, the user's operability of the predetermined processes such as viewing, selection and timer recording of contents, and viewing of related information can be improved.

In the above processing sequence, the example that EPG SI and ECG information about programs currently receivable by the television 102, programs to be broadcasted next, programs to be broadcasted today and programs to be broadcasted during a week are sequentially acquired is described. However, the acquiring processes are not limited to this order. That is to say, the acquiring processes are appropriately executed by the remote controller 100, and may be executed in parallel or in a different order.

(5. Process Flow of the Remote Controller 100 According to the User's Operation)

A process flow of the remote controller 100 in the case where the user selects predetermined program information or related information displayed on the remote controller 100 is described below.

(In the Case where the Program Information Displayed on the Program Display Unit 170 is Selected)

Figure 24:
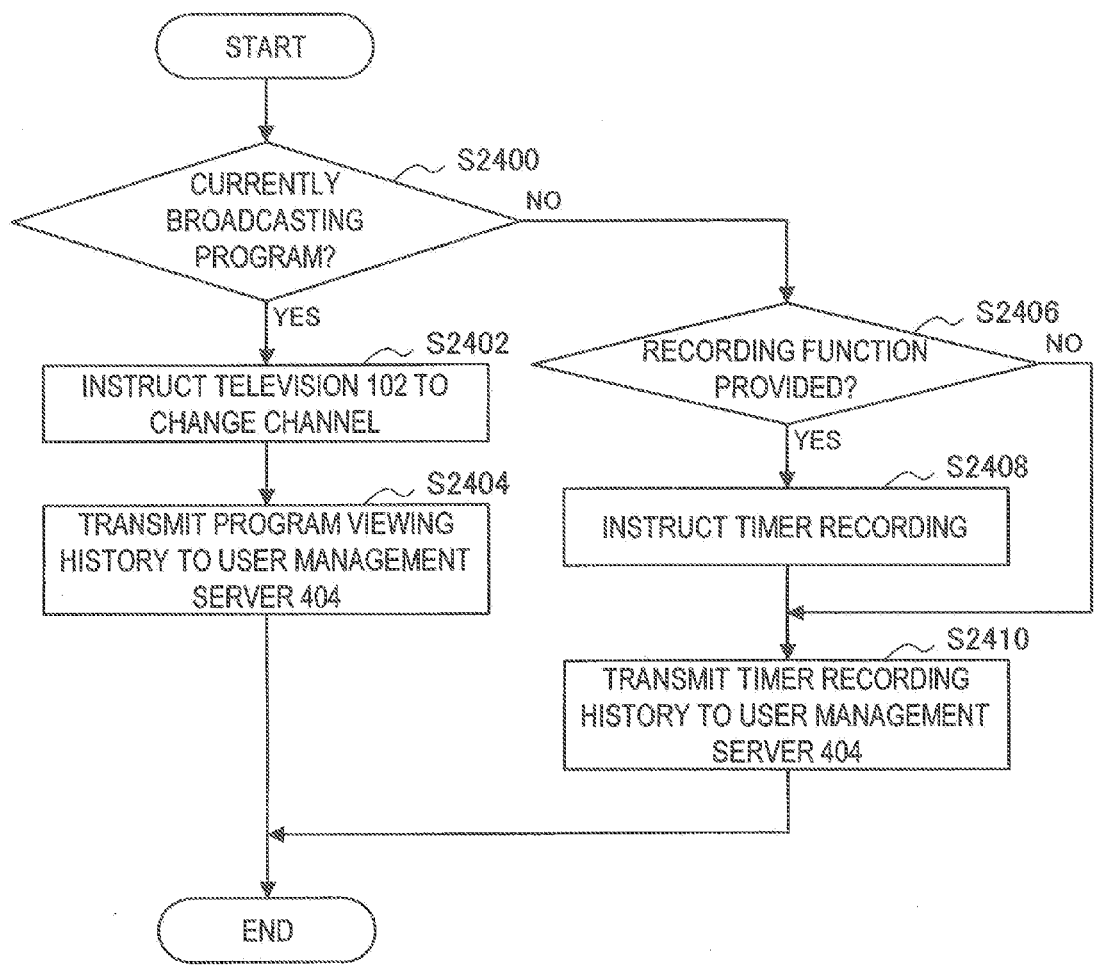
FIG. 24 is a flow chart illustrating a process flow of the remote controller 100 in the case where a user selects a predetermined program displayed on the program display unit 170 of the remote controller 100 in the embodiment.

FIG. 24 is a flow chart illustrating the process flow of the remote controller 100 in the case where the user selects a predetermined program displayed on the program display unit 170 of the remote controller 100.

When the user selects a predetermined program displayed on the program display unit 170, the remote controller 100 determines whether the program selected by the user is a currently broadcasting program at step 2400. When it is the currently broadcasting program, the remote controller 100 transmits a command signal for changing the channels to the television 102 at step 2402. These processes are executed by the device processing unit 156, the device communication unit 176 and the like of the remote controller 100 as described above.

Thereafter, the remote controller 100 transits information about the program selected by the user as a program viewing history to the user management server 404 of the ECG service server 400 at step 2404. As a result, the user management server 404 can manage the viewing history as preference information about the user using the remote controller 100, so as to be capable of utilizing it for creating recommended information. The process at step 2404 is executed by the preference information control unit 186, the ECG server communication unit 178, and the like of the remote controller 100 as described above.

On the other hand, when the determination is made that the program selected by the user is not the currently broadcasting program at step 2400, the remote controller 100 determines whether the broadcasting reception apparatus 110 which receives the program has the recording function at step 2406. The device management unit 180 of the remote controller 100 can determine whether the broadcasting reception apparatus 110 which receives the program has the recording function based on the device information associated with the device ID as described above.

When the broadcasting reception apparatus 110 has the recording function, the remote controller 100 transmits a command signal for instructing the timer recording of the program selected by the user to the broadcasting reception apparatus 110 at step 2408. In response to this, the broadcasting reception apparatus 110 can set the timer recording of the program.

Thereafter, the remote controller 100 transmits the information about the program with the timer recording being set by the user as a timer recording history to the user management server 404 of the ECG service server 400 at step 2410. As a result, the user management server 404 can manage the timer recording history as preference information about the user using the remote controller 100 so as to be capable of using the information for creating recommended information. The process at step 2410 is executed by the preference information control unit 186, the ECG server communication unit 178, and the like of the remote controller 100 as described above.

On the other hand, also when the determination is made that the broadcasting reception apparatus 110 does not have the recording function at step 2406, the remote controller 100 executes step 2410 similarly. That is to say, the remote controller 100 transmits a selection history of the program information as the timer recording history to the user management server 404 of the ECG service server 400. This is because the timer recording is not actually set but the user requests the timer recording of the program, it is preferable to reflect this to the user's preference information.

When the user selects a predetermined program to be displayed on the program display unit 170, the remote controller 100 can transmit information about the viewing history and timer recording history to the user management server 404. The user management server 404 can manage the information as the preference information and create recommended information which matches with the program preference of the user using the remote controller 100. As a result, the remote controller 100, for example, acquires only the information which matches with the user's preference in a lot of pieces of program information for one week from the ECG service server 400 so as to be capable of providing it to the user.

(In the Case where Product Displayed on the Related Information Display Unit 172 is Selected)

Figure 25:
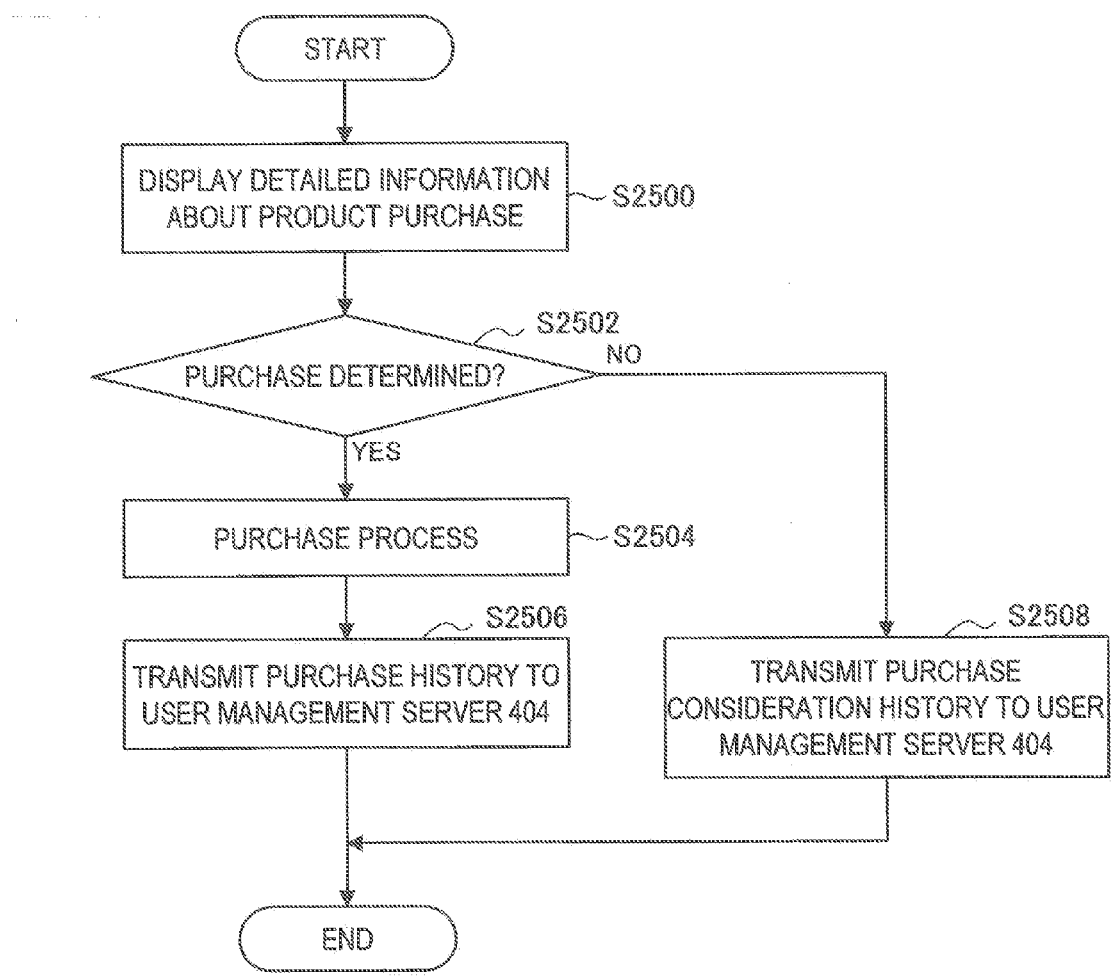
FIG. 25 is a flow chart illustrating a process flow of the remote controller 100 in the case where a user selects predetermined product purchasing information displayed on a related information display unit 172 of the remote controller in the embodiment.

FIG. 25 is a flow chart illustrating a process flow in the remote controller 100 in the case where the user selects predetermined related information displayed on the related information display unit 172 of the remote controller 100. The flow chart shown in FIG. 25 is an example in the case where the user selects related information relating to product purchase.

When the user selects a predetermined product displayed on the related information display unit 172, the remote controller 100 displays information necessary for purchasing the product at step 2500. The necessary information includes various information such as details of the product, payment method, delivery address, telephone number, name, and the like. The information about user's personal information, such as payment method, delivery address, telephone number and name, is managed by the user management server 404 in profile setting for each remote controller 100. Therefore, the remote controller 100 can acquire the information from the user management server 404 and display the information. As a result, the user does not have to input the information such as payment method again.

Thereafter, the remote controller 100 determines whether the user determines to purchase a product at step 2502. For example, the user selects a purchase decision button displayed on the display unit 154 so as to be capable of finally deciding the product purchase. When the user finally decides the product purchase, the remote controller 100 executes product purchasing process at step 2504. For example, the purchasing process can be executed by transmitting various information about the product purchase to the sponsor 304 which provides the product via the ECG service server 400.

Thereafter, the remote controller 100 transmits the information about the product selected by the user as a product purchase history to the user management server 404 of the ECG service server 400 at step 2506. As a result, the user management server 404 can manage the product purchase history as preference information about the user using the remote controller 100, so as to be capable of using the information for creating the recommended information.

On the other hand, also when the user cancels the product purchase at step 2502, the remote controller 100 transmits a selection history of the related information as the product purchase consideration history to the user management server 404 of the ECG service server 400 at step 2508. This is because since the product is not actually purchased but the user considers the purchase of the product, it is preferable to reflect this to the user's preference information.

When the user selects a predetermined product displayed on the related information display unit 172, the remote controller 100 can transmit information about the product purchase history and the product purchase consideration history to the user management server 404. The user management server 404 can manage the information as the preference information, so as to be capable of creating recommended information matching with the program preference of the user using the remote controller 100. As a result, the remote controller 100 can acquire only information matching with the user's preference from the ECG service server 400 so as to be capable of providing it to the user.

The flow chart shown in FIG. 25 is one example of the process for purchasing the products displayed on the related information display unit 172, but the other related information, for example, about introduction of a Web page and performers are also subject to the same process. That is to say, when the user selects predetermined related information, the remote controller 100 can transmit various information about user's viewing history of a Web page and viewing history of performer information to the user management server 404. The user management server 404 can also weight the transmitted plural pieces of history information according to types, so as to be capable of managing them as preference information. As a result, the user management server 404 can provide information which further matches with the user's preference to the user using the remote controller 100.

The remote controller 100 according to the embodiment receives EPG SI from the broadcasting reception apparatus 110 such as the television 102, so as to be capable of sequentially displaying program information on the program display unit 170. The remote controller 100 receives ECG information from the ECG service server 400, so as to be capable of sequentially displaying various related information relating to programs displayed on the program display unit 170 on the related information display unit 172. The user management server 404 of the ECG service server 400 can manage recommended information for each remote controller 100 (each user) based on the user's profile information and preference information. As a result, the remote controller 100 can acquire only various information which matches with the user's preference from the ECG service server 400. As a result, the remote controller 100 according to the embodiment displays information about contents received from the broadcasting reception apparatus 110 and various related information relating to the contents received from the information providing server. Accordingly, the user's operability of predetermined processes such as viewing, selection and setting of the timer recording of the contents, and viewing of related information can be improved.

The remote controller 100 can associate device information about the at least one or more communicable broadcasting reception apparatus 110 with device IDs so as to be capable of managing them. Further, the remote controller 100 can transmit a command instruction for the timer recording to the broadcasting reception apparatus 100 such as a recording/reproducing apparatus having the timer recording function. At this time the remote controller 100 can, for example, associate information about a program with timer recording being set and the like with the device ID of the broadcasting reception apparatus 110, which is a transmission destination of the command instruction, so as to be capable of storing it as the contents ID. As a result, the remote controller 100 can associate the a list of the programs with the timer recording being instructed to the respective recording/reproducing apparatus with the device IDs so as to be capable of managing them. In the related art, in order to reproduce a predetermined recorded program, the recording/reproducing apparatus which has recorded the program should be selected from the plurality of recording/reproducing apparatus, the program should be searched according to a menu displayed on the television screen, and a reproducing instruction should be transmitted by using the remote controller at hand. On the contrary, when the user selects the recorded program displayed on the display unit 154, the remote controller 100 according to the embodiment refers to the contents ID of the program so as to be capable of transmitting the instruction to reproduce the program to the corresponding recording/reproducing apparatus. As a result, when the user only selects a desired program from the program list displayed on the display unit 154 of the remote controller 100, the user can allow the recording/reproducing apparatus which has recorded the program to start the reproduction of the program.

The remote controller 100 can execute an information processing program for executing the various functions and processes according to the embodiment. The program is, for example, stored in a program storage unit of the remote controller 100, and is loaded and executed by a CPU (Central Processing Unit). As a result, the remote controller 100 can execute the various functions and processes. Therefore, the remote controller 100 updates the program, so as to be capable of adding a new function and upgrading the program. The information processing program can be provided by a recording medium readable by the remote controller 100. The recording medium is, for example, a magnetic disc, an optical disc, a magneto-optical disc or a flash memory. The information processing program may be distributed via a network without using the recording medium.

The users, the providers or sponsors which provide services, and the like can realize improvement in various conveniences and development of information providing services other than the above ones using the service system 300 utilizing the remote controller 100 according to the embodiment.

The ECG service server 400 can provide only related information which matches user's preference to the user using the remote controller 100. Therefore, sponsors which provide various related information relating to program contents and the like can provide the information efficiently to users who truly request such information. The sponsors and the like can provide coupon information, for example, together with related information. As a result, the sponsors can realize new services such that users who view coupon information by means of the remote controllers 100 can be taken to shops efficiently.

In the service system 300 shown in FIG. 3, the ECG service provider 306 can provide ECG information to the television 102, but in general, the television 102 may not be always connected to a network. Even when the television 102 can acquire ECG information from the ECG service provider 306, a user may not, for example, view the ECG information without changing screen display on the television 102 into double screen or without multiple display. For this reason, such a television 102 is inconvenient for the user. On the contrary, the remote controller 100 according to the embodiment receives ECG information from the ECG service server 400 of the ECG service provider 306 so as to be capable of displaying it. Therefore, even when diffusion of the ECG information providing service using the television 102 does not progress, an information provider such as the ECG service provider 306 can provide various information to users efficiently.

Remote controllers in related art normally has one to one correspondence to the broadcasting reception apparatus 110 such as the televisions 102. Plural pieces of preference information, for example, can be set on the television 102 or the like, but, for example, a plurality of users at home should transmit instructions to menus displayed on the television screen by operating one remote controller. On the contrary, in the service system 300 according to the embodiment, the ECG service server 400 can manage profile setting and preference information according to each remote controller 100. Therefore, unlikely to the remote controllers in related art, the remote controllers 100 according to the embodiment do not have one to one correspondence to the broadcasting reception apparatus 110, but can have one to one correspondence to the users. As a result, for example, a plurality of users at home has exclusive remote controllers 100, respectively, so that program viewing, setting of timer recording and viewing of related information which match only with user's own preference can be realized by utilizing various information displayed on the remote controllers 100.

When each user has the exclusive remote controller 100, various usage examples are assumed. For example, when the remote controller 100 stores EPG SI received from the television 102 therein, the user who carries the remote controller 100 can view various information about programs to be broadcasted today and programs to be broadcasted during a week at the time of commuting, and the like. As a result, the user does not have to check a television time table on a newspaper after arriving home.

Program information, related information and the like which are recommended by a user can be provided to a user having another remote controller 100. This can be realized, for example by transmitting and receiving various information is between the remote controllers 100, and by allowing another user (friend) to access to the user management server 404 managing the user's preference information.

The user can set settlement information as profile information as described above. Therefore, when the user purchases a product based on related information received from the ECG service server 400, the user can uses various settlement methods. For example, when a plurality of credit cards is registered in the profile information, the user selects any credit card so as to be capable of making settlement at the time of purchase. Also when a plurality of products is purchased based on related information, all settlements can be made at once based on settlement information registered into the profile information. Further when a reader/writer function is provided to the remote controller 100, e-money is held over the remote controller 100 so that settlement can be made. Further when an upper limit of settlement amount is set to the profile information, excessive purchased amount can be prevented. As a result, for example, parents can safely allow children to use the remote controller 100 with easy mind.

The profile information, the preference information, and the like about the respective users using the remote controllers 100 are managed by the user management server 404, and are appropriately updated based on the users' viewing histories. Therefore, the more the user uses the remote controller 100, the more the related information and the like which matches with the user's preference can be acquired by the user, and thus usability is improved. As a result, the user can enjoy using the remote controller 100 as information providing medium different from a television. Further, even when the user loses the remote controller 100 for example, the user can utilize a newly purchased remote controller 100 at once with similar usability to that of the former remote controller 100 based on the information managed by the user management server 404.

As described above, in the service system 300 using the remote controller 100 according to the embodiment, various functions can be additionally provided, so that user's convenience and extensibility of the service deployment on the service provider side can be improved.

It should be understood by those skilled in the art that various modifications, combinations, sub-combinations and alterations may occur depending on design requirements and other factors insofar as they are within the scope of the appended claims or the equivalents thereof.

For example, the embodiment describes mainly the remote controller 100 as one example of the handheld terminal, but the present invention is not limited to this. Examples of the handheld terminal may be portable information processing apparatus having a communication function such as mobile telephone, PDA and portable game machine. In the case of an apparatus, which can receive a broadcasting signal from the content provider 302 such as a TV station, like a mobile telephone, video contents as well as the program information and the related information can be displayed based on the received broadcasting signal. As a result, the user can simultaneously view video contents, content information and related information, and set the timer recording, for example.

The abovementioned various processes in the remote controller 100 are examples for describing the embodiment, and thus the processes are not necessarily executed in the same order and methods as the above ones. For example, in the embodiment, currently broadcasting programs, programs to be broadcasted next, filtered programs to be broadcasted today, and filtered programs to be broadcasted during a week are displayed on the program display unit 170, but the present invention is not limited to this. For example, only currently broadcasting programs and filtered programs to be broadcasted during a week can be displayed. As described, for type of information to be displayed, arrangements of the display screen, the number of information to be displayed, display order, display time, and the like, setting can be arbitrarily changed, for example, by the user, and thus the setting is not limited to specified methods.

The contents of the profile information and preference information described in the embodiment are examples for describing the embodiment, and the present invention is not limited to this. That is to say, besides the above contents, a user can set various information about preferred broadcasting station, film director, language, singer, sports player, broadcaster, and the like as the profile information. As to information about the viewing histories transmitted to the user management server 404 by the remote controller 100, it is naturally possible that the user arbitrarily sets which kind of history information is to be transmitted and which kind of history information is not to be transmitted.

What is claimed is:

1. A handheld terminal comprising:
 a device communication unit configured to communicate with at least one or more broadcasting reception apparatus to receive, from the broadcasting reception apparatus, content information about contents from a content provider;
 a server communication unit configured to communicate with an information providing server to receive, from the information providing server, related information relating to the content information received by the device communication unit; and
 a display unit configured to display the content information received from the broadcasting reception apparatus and the related information received from the information providing server,
 the server communication unit being operable (i) to transmit, to the information providing server, a filtering request signal which requests that content information about a plurality of contents, in which the content information about the plurality of contents is from the content provider and received by the handheld terminal from the broadcasting reception apparatus, transmitted to the information providing server from the handheld terminal, be filtered so as to obtain filtered content information, in which the filtered content information is determined by filtering by the information providing server of the content information about the plurality of contents transmitted and only matches a user's preference, and (ii) in response to the filtering request signal, to receive information based on the filtered content information from the information providing server.

2. The handheld terminal according to claim 1, wherein the display unit is configured to display plural pieces of the content information received from the broadcasting reception apparatus while switching sequentially.

3. The handheld terminal according to claim 2, wherein the display unit is configured to display the related information relating to the content information while switching sequentially according to the content information displayed by the display unit while being switched sequentially.

4. The handheld terminal according to claim 3, wherein
 the device communication unit is configured to receive content information about currently broadcasting contents, content information about contents to be broadcasted next, content information about contents to be broadcasted today and content information about contents to be broadcasted during a week in content information receivable from the content provider by the broadcasting reception apparatus, and
 the display unit is configured to display the content information about the currently broadcasting contents, the content information about the contents to be broadcasted next, the content information about the contents to be broadcasted today and the content information about the contents to be broadcasted during a week, received from the broadcasting reception apparatus, while switching sequentially.

5. The handheld terminal according to claim 4, wherein the server communication unit is configured to transmit information about contents preference input by a user as profile information to the information providing server.

6. The handheld terminal according to claim 5, further comprising a device management unit configured to give a device ID to each broadcasting reception apparatus and manage device information about all the broadcasting reception apparatus with which the device communication unit is communicable.

7. The handheld terminal according to claim 6, wherein when a user selects the content information displayed on the display unit, the device communication unit transmits a request signal for requesting a predetermined process on contents corresponding to the content information to the broadcasting reception apparatus which has transmitted the content information.

8. The handheld terminal according to claim 7, wherein when contents corresponding to the content information selected by the user are the currently broadcasting contents, the device communication unit transmits a request signal for requesting display of the contents to the broadcasting reception apparatus which transmits the content information.

9. The handheld terminal according to claim 8, wherein
 when contents corresponding to the content information selected by the user are the contents to be broadcasted in the future, the device communication unit determines whether the broadcasting reception apparatus which has transmitted the content information has a timer recording function based on device information associated with the device ID,
 when the broadcasting reception apparatus has the timer recording function, a request signal for requesting timer recording of the contents is transmitted to the broadcasting reception apparatus.

10. The handheld terminal according to claim 9, wherein when a user selects the content information or the related information displayed on the display unit, the server communication unit transmits the content information or the related information selected by the user as contents preference information of the user indicative of at least part of the user's preference to the information providing server.

11. The handheld terminal according to claim 10, wherein the display unit is configured to display the filtered content information received from the information providing server while switching sequentially.

12. The handheld terminal according to claim 1, wherein the user's preference is obtained from profile information registered by the user.

13. The handheld terminal according to claim 1, wherein the user's preference is obtained from information pertaining to a viewing history of the user.

14. An information providing method comprising the steps of:
 communicating with at least one or more broadcasting reception apparatus to receive, from the broadcasting reception apparatus, content information about contents from a content provider;
 communicating with an information providing server to receive, from the information providing server, related information relating to the content information received at the content information receiving step; and displaying the content information received and the related information received, said method further comprising:

transmitting, to the information providing server, a filtering request signal which requests that content information about a plurality of contents, in which the content information about the plurality of contents is from the content provider and received by the handheld terminal from the broadcasting reception apparatus, transmitted to the information providing server from the handheld terminal, be filtered so as to obtain filtered content information, in which the filtered content information is determined by filtering by the information providing server the content information about the plurality of contents transmitted and only matches a user's preference, and in response to the filtering request signal, receiving information based on the filtered content information from the information providing server.

15. A non-transitory computer readable medium configured to store thereon an information processing program which allows a computer to execute:

a content information receiving process for communicating with at least one or more broadcasting reception apparatus to receive, from the broadcasting reception apparatus, content information about contents from a content provider;

a related information receiving process for communicating with an information providing server to receive, from the information providing server, related information relating to the content information received by the content information receiving process; and a display process for displaying the content information received by the content information receiving process and the related information received by the related information receiving process, and which further allows the computer to execute:

a process for transmitting, to the information providing server, a filtering request signal which requests that content information about a plurality of contents in which the content information about the plurality of contents is from the content provider and received by the handheld terminal from the broadcasting reception apparatus, transmitted to the information providing server from the handheld terminal, be filtered so as to obtain filtered content information, in which the filtered content information is determined by filtering by the information providing server of the content information about the plurality of contents transmitted and only matches a user's preference, and a process which in response to the filtering request signal, for receiving information based on the filtered content information from the information providing server.

16. An information providing server comprising:

a storage unit configured to acquire related information from a content provider which distributes contents and a sponsor relating to the contents so as to manage the related information;

a related information request receiving unit configured to receive a related information request signal for requesting related information relating to content information displayed by a handheld terminal, from the handheld terminal which receives and displays content information about the contents distributed by the content provider from the broadcasting reception apparatus;

a related information extraction unit configured to extract the related information relating to the content information displayed by the handheld terminal from the storage unit according to the reception of the related information request signal; and a related information transmission unit configured to transmit the related information extracted by the related information extraction unit to the handheld terminal, the server further comprising:

a unit configure to receive a filtering request signal, transmitted from the handheld terminal, which requests that content information about a plurality of contents, in which the content information about the plurality of contents is from the content provider and received by the handheld terminal from the broadcasting reception apparatus, transmitted to the information providing server from the handheld terminal, be filtered so as to obtain filtered content information, in which the filtered content information is determined by filtering by the information providing server of the content information about the plurality of contents transmitted and only matches a user's preference, and a unit which in response to the filtering request signal, transmits information based on the filtered content information for reception by the handheld terminal.

17. An information providing system comprising:

a handheld terminal which includes;

a device communication unit configured to communicate with at least one or more broadcasting reception apparatus to receive, from the broadcasting reception apparatus, content information about contents from a content provider, a server communication unit configured to communicate with an information providing server to receive, from the information providing server, related information relating to the content information received by the device communication unit from the broadcasting reception apparatus, a display unit configured to display the content information received from the broadcasting reception apparatus and the related information received from the information providing server, and the server communication unit being operable (i) to transmit, to the information providing server, a filtering request signal which requests that content information about a plurality of contents, in which the content information about the plurality of contents is from the content provider and received by the handheld terminal from the broadcasting reception apparatus, transmitted to the information providing server from the handheld terminal, be filtered so as to obtain filtered content information, in which the filtered content information is determined by filtering by the information providing server of the content information about the plurality of contents transmitted and only matches a user's preference, and (ii) in response to the filtering request signal, to receive information based on the filtered content information from the information providing server, and an information providing server which includes;

a storage unit configured to acquire related information from the content provider and a sponsor relating to the contents so as to manage the related information, a related information request receiving unit configured to receive a related information request signal for requesting related information relating to content information displayed by the handheld terminal from the handheld terminal, a related information extraction unit configured to extract related information relating to the content information displayed by the handheld terminal from the storage unit according to the reception of the related information request signal, and a related information transmission unit configured to transmit the related information extracted by the related information extraction unit to the handheld terminal.

\* \* \* \* \*